(12) United States Patent
Minamisawa

(10) Patent No.: US 11,543,673 B2
(45) Date of Patent: Jan. 3, 2023

(54) OPTICAL UNIT WITH SHAKE CORRECTION FUNCTION

(71) Applicant: NIDEC SANKYO CORPORATION, Nagano (JP)

(72) Inventor: Shinji Minamisawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 266 days.

(21) Appl. No.: 17/081,345

(22) Filed: Oct. 27, 2020

(65) Prior Publication Data

US 2021/0132407 A1    May 6, 2021

(30) Foreign Application Priority Data

Oct. 30, 2019    (JP) .............................. JP2019-197808

(51) Int. Cl.
*G02B 27/64* (2006.01)
*G03B 5/00* (2021.01)
*G02B 7/02* (2021.01)

(52) U.S. Cl.
CPC .............. *G02B 27/646* (2013.01); *G02B 7/02* (2013.01); *G03B 5/00* (2013.01); *G03B 2205/0015* (2013.01); *G03B 2205/0023* (2013.01)

(58) Field of Classification Search
CPC .......... G02B 27/646; G02B 7/02; G02B 7/08; G03B 5/00; G03B 2205/0015; G03B 2205/0023; G03B 2205/0053; G03B 30/00; H02K 41/0356; H04N 5/2254; H04N 5/23287
See application file for complete search history.

(56) References Cited

U.S. PATENT DOCUMENTS

| 2017/0176766 | A1* | 6/2017 | Sue ..................... G02B 27/646 |
| 2017/0176767 | A1* | 6/2017 | Yanagisawa ......... G02B 27/646 |
| 2017/0235155 | A1* | 8/2017 | Minamisawa ....... G02B 27/646 359/557 |
| 2018/0321505 | A1* | 11/2018 | Minamisawa ..... H04N 5/23287 |
| 2020/0249421 | A1* | 8/2020 | Hu .......................... G02B 7/08 |

FOREIGN PATENT DOCUMENTS

JP    2015217432 A    12/2015

* cited by examiner

*Primary Examiner* — Darryl J Collins
*Assistant Examiner* — Matthew Y Lee
(74) *Attorney, Agent, or Firm* — Cantor Colburn LLP

(57) ABSTRACT

An optical unit with a shake correction function includes a gimbal mechanism swingably supporting a movable body and including a connection mechanism including a spherical body and a support part contacted with the spherical body. The movable body includes a holding part holding a gimbal frame receiving member including a plate part fixed with the spherical body and a pair of protruded parts protruded to the support part side. The holding part is formed in a cut-out recessed part including a rear wall face, a pair of side wall faces, and a bottom wall face. When viewed in the optical axis direction, a pair of the protruded parts overlaps the support part. The movable body includes a facing wall part facing a pair of the protruded parts, and a separated distance between the facing wall part and the protruded parts is narrower than a thickness of the support part.

14 Claims, 14 Drawing Sheets

OPTICAL UNIT WITH SHAKE CORRECTION FUNCTION

CROSS REFERENCE TO RELATED APPLICATION

The present application claims priority under 35 U.S.C. § 119 to Japanese Application No. 2019-197808 filed on Oct. 30, 2019, and the entire content of which is incorporated herein by reference.

TECHNICAL FIELD

The present invention relates to an optical unit with a shake correction function which includes a connection mechanism structured to turnably connect a movable body having a camera module with a gimbal frame through a spherical body. Further, the present invention relates to an optical unit with a shake correction function which includes a connection mechanism structured to turnably connect a gimbal frame with a fixed body through a spherical body.

BACKGROUND

In an optical unit which is mounted on a portable terminal or a movement body, an optical unit has been proposed which includes a mechanism structured to turn the movable body on which a camera module is mounted around a predetermined axis to correct a shake in order to restrain disturbance of a photographed image of the portable terminal or when the movement body is moved. Such an optical unit with a shake correction function is disclosed in Japanese Patent Laid-Open No. 2015-217432 (Patent Literature 1).

An optical unit with a shake correction function disclosed in Patent Literature 1 includes a movable body, a fixed body and a gimbal mechanism which connects the movable body with the fixed body. The gimbal mechanism turnably supports the movable body around a predetermined axis. The gimbal mechanism includes a gimbal frame which is made of metal and formed in a rectangular frame shape and a connection mechanism which turnably connects the gimbal frame with the movable body around an axis. The connection mechanism includes a spherical body made of metal, a spherical body fixing part to which the spherical body is fixed, and a spherical body support part provided with a hemispherical recessed part with which the spherical body is contacted. The spherical body fixing part is provided on inner side faces of a pair of corner parts of the gimbal frame which face each other in a predetermined axial line direction. The spherical body is fixed to the inner side face of each of the corner parts by welding. The spherical body support part having the hemispherical recessed part is provided at two positions of the movable body so as to face each of the spherical body fixing parts in the predetermined axial line direction.

In a connection mechanism which connects the movable body with the gimbal frame through a spherical body, it may be structured that a spherical body is mounted on the movable body and a concave curved face with which the spherical body is contacted is provided on a side of the gimbal frame. Further, in this case, it is conceivable to structure that a spherical body made of metal is fixed to a thrust receiving member made of metal by welding and the thrust receiving member is held by the movable body. According to this structure, in comparison with a case that a spherical body made of metal is directly welded and fixed to the movable body, material of the movable body can be selected freely.

In a case that a portable terminal and a movement body on which an optical unit with a shake correction function is mounted receive an impact from the outside, a load may be applied to the connection mechanism in a direction intersecting the predetermined axial line due to a weight of the movable body and the like. In other words, a load in an optical axis direction may be applied to the connection mechanism. Therefore, when an impact from the outside is applied, a connecting state of the spherical body mounted on the movable body with a support part provided in the gimbal frame may be released.

Further, a connection mechanism which utilizes a spherical body may be adopted in a structure that a gimbal frame and a fixed body are turnably connected with each other around a predetermined axial line intersecting the optical axis. Also in this case, in a case that a structure is adopted that a spherical body made of metal is fixed to a thrust receiving member made of metal by welding and the thrust receiving member is held by the fixed body, a connecting state of the spherical body mounted on the fixed body with a support part provided in the gimbal frame may be released due to an impact from the outside.

SUMMARY

In view of the problems described above, at least an embodiment of the present invention provides an optical unit with a shake correction function which is capable of preventing or suppressing release of a connecting state of a spherical body mounted on a movable body with a support part of a gimbal frame.

Alternatively, at least an embodiment of the present invention provides an optical unit with a shake correction function which is capable of preventing or suppressing release of a connecting state of a spherical body mounted on a fixed body with a support part of a gimbal frame.

To solve the above-mentioned problem, an embodiment of the present invention may provide an optical unit with a shake correction function including a movable body including a camera module, a gimbal mechanism structured to swingably support the movable body around a first axis intersecting an optical axis of the camera module and swingably support the movable body around a second axis intersecting the optical axis and the first axis, and a fixed body which supports the movable body through the gimbal mechanism. The gimbal mechanism may include a gimbal frame and a connection mechanism structured to turnably connect the gimbal frame with the movable body around the first axis, and the connection mechanism may include a gimbal frame receiving member including a spherical body and a thrust receiving member made of metal to which the spherical body is fixed, and a support part of the gimbal frame including a concave curved face which is contacted with the spherical body. The movable body may include a holding part which holds the gimbal frame receiving member at a position where the first axis passes through a center of the spherical body. In addition, in a case that a direction along the optical axis is referred to as an optical axis direction, one side in the optical axis direction may be referred to as a first direction side, the other side in the optical axis direction may be referred to as a second direction side, a direction along the first axis may be referred to as a first axis direction, and a direction around the optical axis may be referred to as a circumferential direction, the thrust receiving member may include a plate part including a spherical body fixing part to which the spherical body is fixed and facing the support part in the first axis direction through the spherical body, and a pair of protruded parts which are protruded to a side where the support part is located from both ends in the circumferential direction on the second direction side with respect to the spherical body fixing part of the plate part, and a pair of the protruded parts may face each other in the circumferential direction. Further, the holding part may be formed in a cut-out recessed part including a rear wall face which is contacted with the plate part from an opposite side to the support part in the first axis direction, a pair of side wall faces which are extended in the optical axis direction on both sides in the circumferential direction of the rear wall face and face each other in the circumferential direction, and a bottom wall face which is extended in the first axis direction on the first direction side of the rear wall face and is contacted with the thrust receiving member from the first direction side, and the holding part may be opened to the second direction side and to one side in the first axis direction. Further, when viewed in the optical axis direction, a pair of the protruded parts may be overlapped with the support part, the movable body may include a facing wall part which faces a pair of the protruded parts from the one side in the first axis direction, and a separated distance in the first axis direction between the facing wall part and a pair of the protruded parts may be narrower than a thickness in the first axis direction of the support part.

According to an embodiment of the present invention, the connection mechanism which turnably connects the movable body with the gimbal frame around the first axis may include the spherical body fixed to the movable body through the thrust receiving member and the concave curved face provided in the support part of the gimbal frame. The thrust receiving member may be held by the holding part of the movable body. The holding part may be a cut-out recessed part which is opened to the second direction side and to one side in the first axial line direction. Further, the thrust receiving member may be provided with a pair of the protruded parts located on the second direction side with respect to the support part, and each of the protruded parts may be overlapped with the support part when viewed in the optical axis direction. Therefore, even when an impact is applied from the outside, the support part of the gimbal frame is prevented from being moved to the second direction side with respect to a pair of the protruded parts. Further, the movable body may include the facing wall part which faces the protruded parts from one side in the first axis direction to which the holding part is opened, and the separated distance between the facing wall part and a pair of the protruded parts may be narrower than a thickness in the first axis direction of the support part. Therefore, when an impact is applied from the outside, even in a case that the gimbal frame is resiliently bent and the support part is separated from the plate part in the first axis direction, the support part is prevented or suppressed from coming off from the tip end sides of a pair of the protruded parts to the second direction side.

In an embodiment of the present invention, it may be structured that the movable body is provided with a pair of the facing wall parts each of which faces each of a pair of the protruded parts, and a space is provided between a pair of the facing wall parts in the circumferential direction.

In an embodiment of the present invention, it may be structured that each of a pair of the protruded parts is provided with a protruded plate portion which is bent in the first axis direction from an end in the circumferential direction of the plate part, and an extended plate portion which is bent to an opposite side to the plate part in the circumferential direction from an end of the protruded plate portion on an opposite side to the plate part, and each of a pair of the facing wall parts faces the extended plate portion with the separated distance therebetween. According to this structure, areas that the respective protruded parts and the facing wall parts face each other in the first axis direction can be increased and thus, the support part is prevented from coming off from the tip end sides of a pair of the protruded parts to the second direction side.

In an embodiment of the present invention, it may be structured that the gimbal frame is provided with a gimbal frame extended part which is extended between a pair of the protruded parts in the optical axis direction, the gimbal frame extended part is provided with the support part at a tip end on the first direction side and a passing part located between a pair of the protruded parts on the second direction side of the support part, a width dimension in the circumferential direction of the support part is longer than a width dimension in the circumferential direction of the passing part and is longer than a space between the pair of the protruded parts, and a pair of the facing wall parts faces both end portions in the circumferential direction of the support part. According to this structure, when viewed in the optical axis direction, it can be easily set in a state that a pair of the protruded parts and the support part are overlapped with each other. Further, according to this structure, when the gimbal frame is resiliently bent and the gimbal frame extended part is displaced in a direction separated from the plate part, a pair of the facing wall parts is contacted with both end portions in the circumferential direction of the support part. Therefore, the support part is prevented from excessively separating from the plate part in the first axis direction. In other words, when the gimbal frame is resiliently bent, a movable range of the support part can be narrowly restricted.

In an embodiment of the present invention, it may be structured that the gimbal frame extended part is formed in a plate shape, the support part is provided with a convex curved face corresponding to the concave curved face on an end face located on an opposite side to the spherical body in the first axis direction, and the convex curved face is located between a pair of the facing wall parts in the circumferential direction. According to this structure, even in a case that the support part is provided with a convex curved face which is protruded to one side in the first axis direction, a pair of the facing wall parts can be provided at a close position to the plate part.

In an embodiment of the present invention, it may be structured that the thrust receiving member is provided with a bent plate part which is bent in the first axis direction from an end on the first direction side of the plate part and is located on the first direction side with respect to the support part, the bent plate part and the support part are overlapped with each other when viewed in the optical axis direction, the bottom wall face is contacted with the bent plate part, and each of a pair of the facing wall parts faces the bent plate part from the one side in the first axis direction. According to this structure, even when an impact is applied from the outside, the support part of the gimbal frame is prevented from being moved to the first direction side with respect to the bent plate part of the thrust receiving member. Further, according to this structure, each of a pair of the facing wall parts faces each of a pair of the protruded parts from one side in the first axis direction and also faces the bent plate part.

Therefore, even in a case that an impact is applied from the outside, the thrust receiving member is prevented from coming off from the holding part which is a cut-out recessed part to one side in the first axis direction.

It may be structured that the movable body includes one facing wall part which faces both of a pair of the protruded parts. In other words, the movable body may be provided with one facing wall part which closes an opening on one side in the first axis direction of the holding part which is a cut-out recessed part.

Another embodiment of the present invention may provide an optical unit with a shake correction function including a movable body including a camera module, a gimbal mechanism structured to swingably support the movable body around a first axis intersecting an optical axis of the camera module and swingably support the movable body around a second axis intersecting the optical axis and the first axis, and a fixed body which supports the movable body through the gimbal mechanism. The gimbal mechanism may include a gimbal frame and a connection mechanism structured to turnably connect the gimbal frame with the fixed body around the second axis, and the connection mechanism may include a gimbal frame receiving member including a spherical body and a thrust receiving member made of metal to which the spherical body is fixed, and a support part of the gimbal frame including a concave curved face which is contacted with the spherical body. The fixed body may be provided with a holding part which holds the gimbal frame receiving member at a position where the second axis passes through a center of the spherical body. In addition, in a case that a direction along the optical axis is referred to as an optical axis direction, one side in the optical axis direction may be referred to as a first direction side, the other side in the optical axis direction may be referred to as a second direction side, a direction along the second axis may be referred to as a second axis direction, and a direction around the optical axis may be referred to as a circumferential direction, the thrust receiving member may be provided with a plate part which is provided with a spherical body fixing part to which the spherical body is fixed and faces the support part in the second axis direction through the spherical body, and a pair of protruded parts which are protruded to a side where the support part may be located from both ends in the circumferential direction on the second direction side with respect to the spherical body fixing part of the plate part, and a pair of the protruded parts may face each other in the circumferential direction. Further, the holding part may be formed in a cut-out recessed part including a rear wall face which is contacted with the plate part from an opposite side to the support part in the second axis direction, a pair of side wall faces which are extended in the optical axis direction on both sides in the circumferential direction of the rear wall face and face each other in the circumferential direction, and a bottom wall face which is extended in the second axis direction on the first direction side of the rear wall face and is contacted with the thrust receiving member from the first direction side, and the holding part may be opened to the second direction side and to one side in the second axis direction. Further, when viewed in the optical axis direction, a pair of the protruded parts may be overlapped with the support part, the fixed body may be provided with a facing wall part which faces a pair of the protruded parts from the one side in the second axis direction, and a separated distance in the second axis direction between the facing wall part and a pair of the protruded parts may be narrower than a thickness in the second axis direction of the support part.

According to an embodiment of the present invention, the connection mechanism which turnably connects the fixed body with the gimbal frame around the second axis may include the spherical body fixed to the fixed body through the thrust receiving member and the concave curved face provided in the support part of the gimbal frame. The thrust receiving member may be held by the holding part of the fixed body. The holding part may be a cut-out recessed part which is opened to the second direction side and to one side in the second axis direction. Further, the thrust receiving member may be provided with a pair of the protruded parts located on the second direction side with respect to the support part, and each of the protruded parts may be overlapped with the support part when viewed in the optical axis direction. Therefore, even when an impact is applied from the outside, the support part of the gimbal frame is prevented from being moved to the second direction side with respect to a pair of the protruded parts. Further, the fixed body is provided with the facing wall part which faces the protruded parts from one side in the second axis direction to which the holding part is opened, and the separated distance between the facing wall part and a pair of the protruded parts is narrower than a thickness in the second axis direction of the support part. Therefore, when an impact is applied from the outside, even in a case that the gimbal frame is resiliently bent and the support part is separated from the plate part in the second axis direction, the support part is prevented or suppressed from coming off from the tip end sides of a pair of the protruded parts to the second direction side.

In an embodiment of the present invention, it may be structured that the fixed body is provided with a pair of the facing wall parts each of which faces each of the pair of the protruded parts, and a space is provided between a pair of the facing wall parts in the circumferential direction.

In an embodiment of the present invention, it may be structured that each of a pair of the protruded parts is provided with a protruded plate portion which is bent in the second axis direction from an end in the circumferential direction of the plate part, and an extended plate portion which is bent to an opposite side to the plate part in the circumferential direction from an end of the protruded plate portion on an opposite side to the plate part, and each of a pair of the facing wall parts faces the extended plate portion with the separated distance therebetween. According to this structure, areas that the respective protruded parts and the respective facing wall parts face each other in the second axis direction can be increased and thus, the support part is prevented from coming off from the tip end sides of a pair of the protruded parts to the second direction side.

In an embodiment of the present invention, it may be structured that the gimbal frame is provided with a gimbal frame extended part which is extended between a pair of the protruded parts in the optical axis direction, the gimbal frame extended part is provided with the support part at a tip end on the first direction side and a passing part located between a pair of the protruded parts on the second direction side of the support part, a width dimension in the circumferential direction of the support part is longer than a width dimension in the circumferential direction of the passing part and is longer than a space between a pair of the protruded parts, and a pair of the facing wall parts faces both end portions in the circumferential direction of the support part. According to this structure, when viewed in the optical axis direction, it can be easily set in a state that a pair of the protruded parts and the support part are overlapped with each other. Further, according to this structure, when the gimbal frame is resiliently bent and the gimbal frame extended part is displaced in a direction separated from the plate part, a pair of the facing wall parts is contacted with both end portions in the circumferential direction of the support part. Therefore, the support part is prevented from excessively separating from the plate part in the second axis direction. In other words, a movable range of the support part can be narrowly restricted.

In an embodiment of the present invention, it may be structured that the gimbal frame extended part is formed in a plate shape, the support part is provided with a convex curved face corresponding to the concave curved face on an end face located on an opposite side to the spherical body in the second axis direction, and the convex curved face is located between a pair of the facing wall parts in the circumferential direction. According to this structure, even in a case that the support part is provided with a convex curved face which is protruded to one side in the second axis direction, a pair of the facing wall parts can be provided at a close position to the plate part.

In an embodiment of the present invention, it may be structured that the thrust receiving member is provided with a bent plate part which is bent in the second axis direction from an end on the first direction side of the plate part and is located on the first direction side with respect to the support part, the bent plate part and the support part are overlapped with each other when viewed in the optical axis direction, the bottom wall face is contacted with the bent plate part, and each of a pair of the facing wall parts faces the bent plate part from the one side in the second axis direction. According to this structure, even when an impact is applied from the outside, the support part of the gimbal frame is prevented from being moved to the first direction side with respect to the bent plate part of the thrust receiving member. Further, according to this structure, each of a pair of the facing wall parts faces each of a pair of the protruded parts from one side in the second axis direction and also faces the bent plate part. Therefore, even in a case that an impact is applied from the outside, the thrust receiving member is prevented from coming off from the holding part which is a cut-out recessed part to one side in the second axis direction.

In an embodiment of the present invention, it may be structured that the fixed body includes one facing wall part which faces both of the pair of the protruded parts. In other words, the fixed body may be provided with one facing wall part which closes an opening on one side in the second axis direction of the holding part which is a cut-out recessed part.

[Effects of the Invention]

According to an embodiment of the present invention, the connection mechanism which turnably connects the movable body with the gimbal frame around the first axis includes the spherical body held by the thrust receiving member and the concave curved face provided in the support part of the gimbal frame. Further, the thrust receiving member is provided with a pair of the protruded parts on the second direction side with respect to the support part of the gimbal frame. Therefore, even when an impact is applied from the outside, the support part of the gimbal frame is prevented from being moved to the second direction side with respect to a pair of the protruded parts in the optical axis direction. Further, the movable body includes the facing wall part which faces a pair of the protruded parts from a side where the holding part is opened, and the separated distance between a pair of the protruded parts and the facing wall part is narrower than a thickness of the support part. Therefore, when an impact is applied from the outside, even in a case that the gimbal frame is resiliently bent, the support part is prevented from coming off from the tip end sides of a pair of the protruded parts to the second direction side.

According to another embodiment of the present invention, the connection mechanism which turnably connects the fixed body with the gimbal frame around the second axis includes the spherical body held by the thrust receiving member and the concave curved face provided in the support part of the gimbal frame. Further, the thrust receiving member is provided with a pair of the protruded parts on the second direction side with respect to the support part of the gimbal frame. Therefore, even when an impact is applied from the outside, the support part of the gimbal frame is prevented from being moved to the second direction side with respect to a pair of the protruded parts in the optical axis direction. Further, the fixed body includes the facing wall part which faces a pair of the protruded parts from a side where the holding part is opened, and the separated distance between a pair of the protruded parts and the facing wall part is narrower than a thickness of the support part. Therefore, when an impact is applied from the outside, even in a case that the gimbal frame is resiliently bent, the support part is prevented from coming off from the tip end sides of a pair of the protruded parts to the second direction side.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of an optical unit with a shake correction function to which the present invention is applied will be described below with reference to the accompanying drawings.
(Optical Unit with Shake Correction Function)

Figure 1:
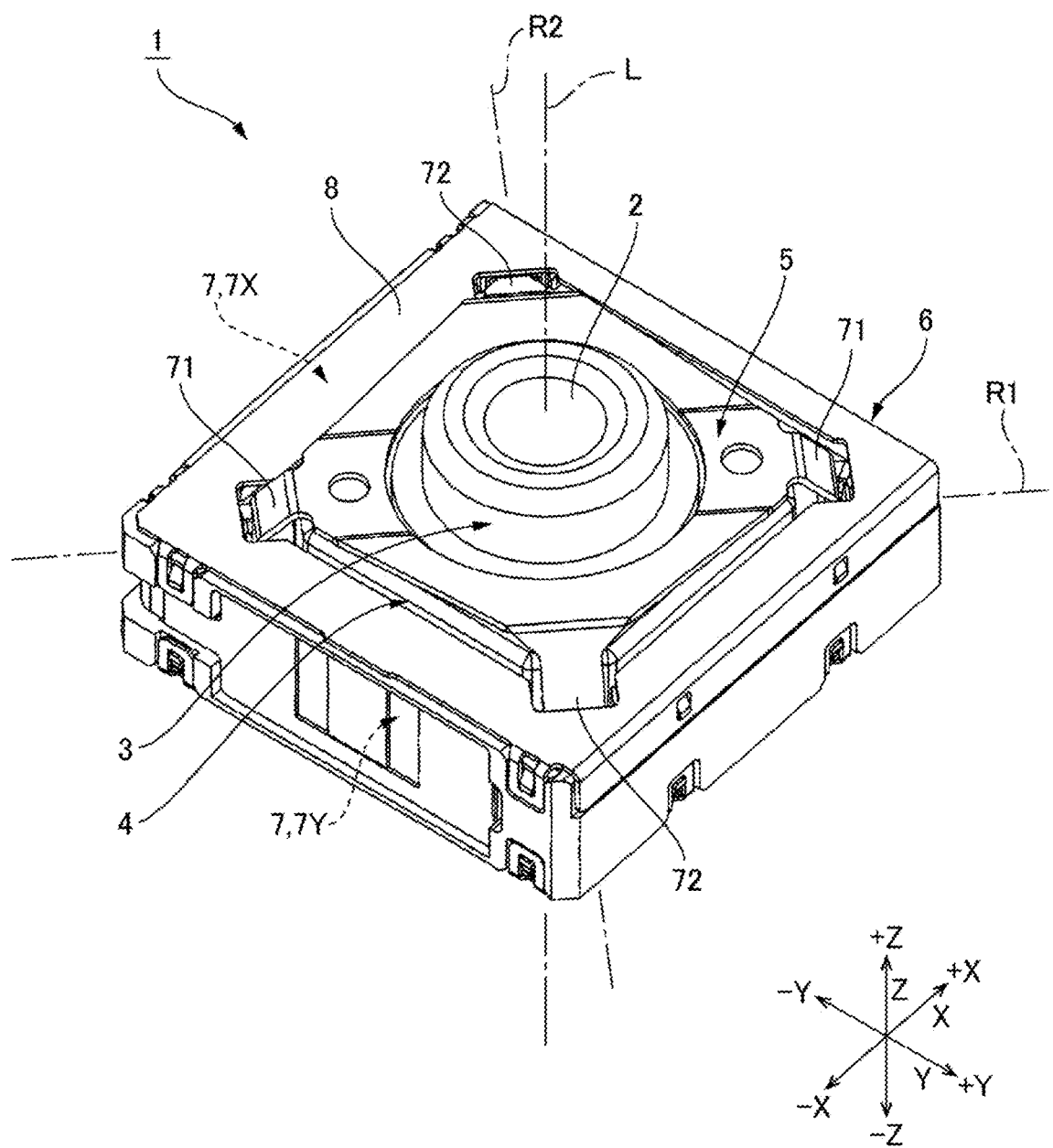
FIG. 1 is a perspective view showing an optical unit with a shake correction function.
Figure 2:
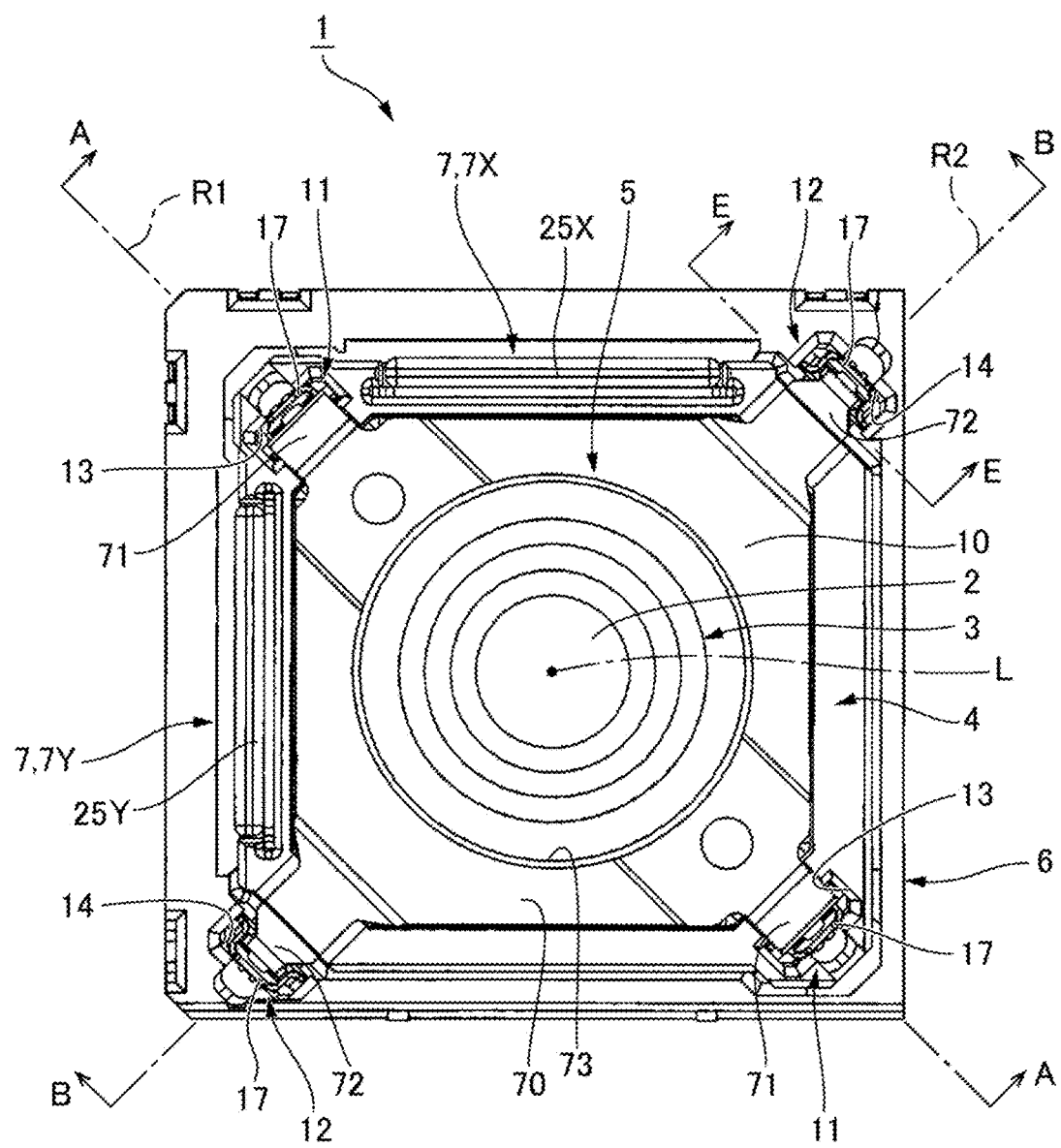
FIG. 2 is a plan view showing an optical unit with a shake correction function in which a cover is detached.
Figure 3:
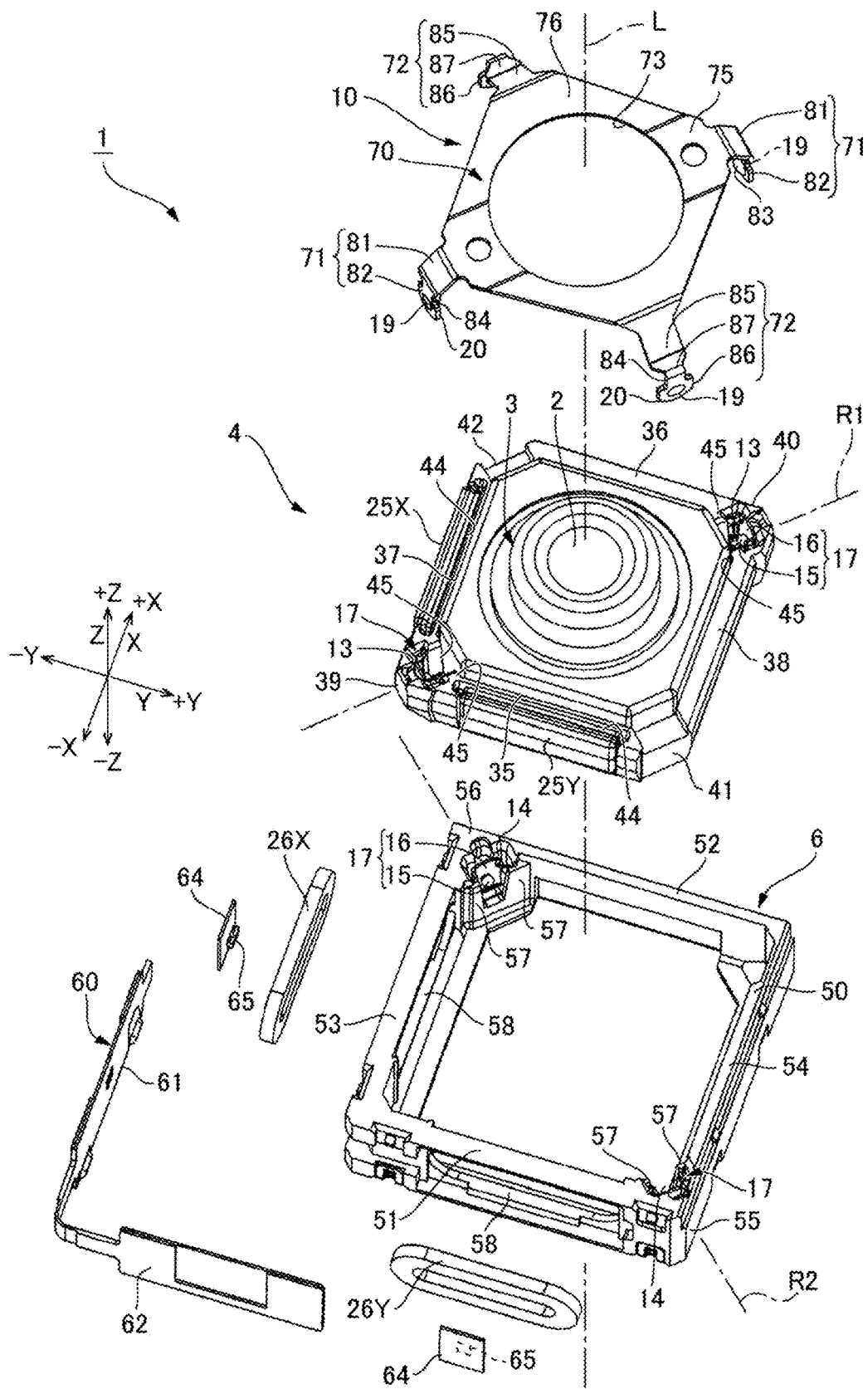
FIG. 3 is an exploded perspective view showing an optical unit with a shake correction function.
Figure 4:
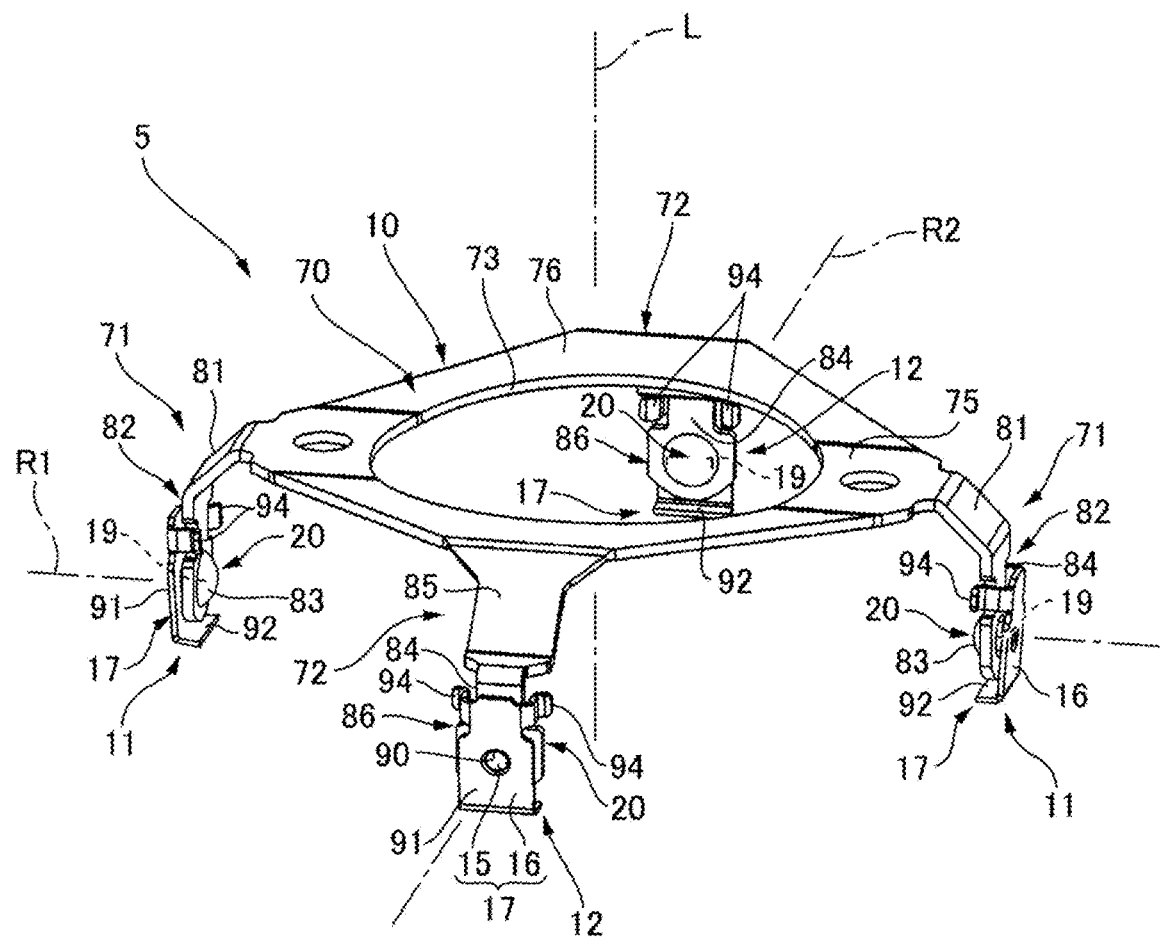
FIG. 4 is a perspective view showing a gimbal mechanism.
Figure 5:
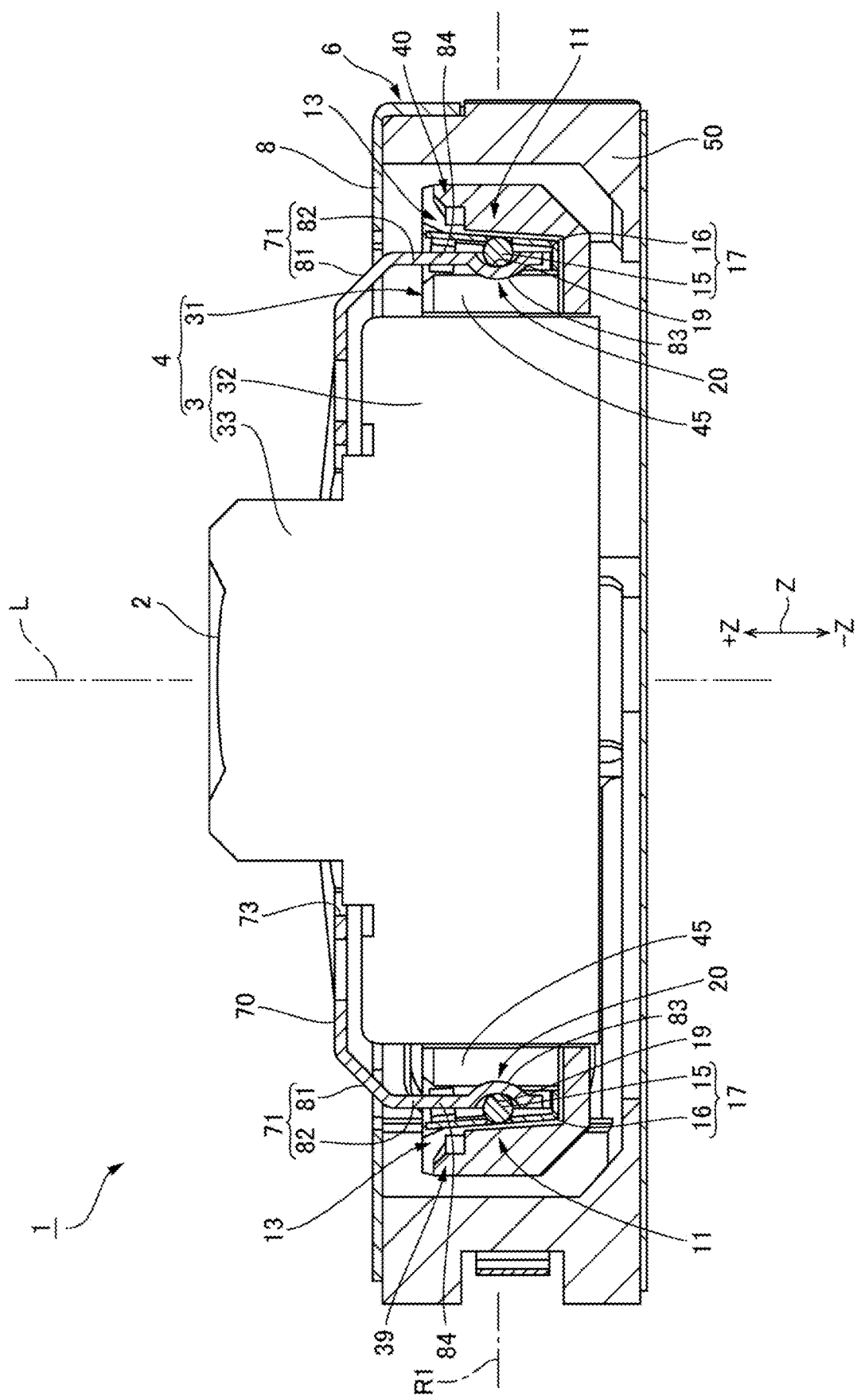
FIG. 5 is a cross-sectional view showing the optical unit with a shake correction function which is cut by the "A-A" line in FIG. 2.
Figure 6:
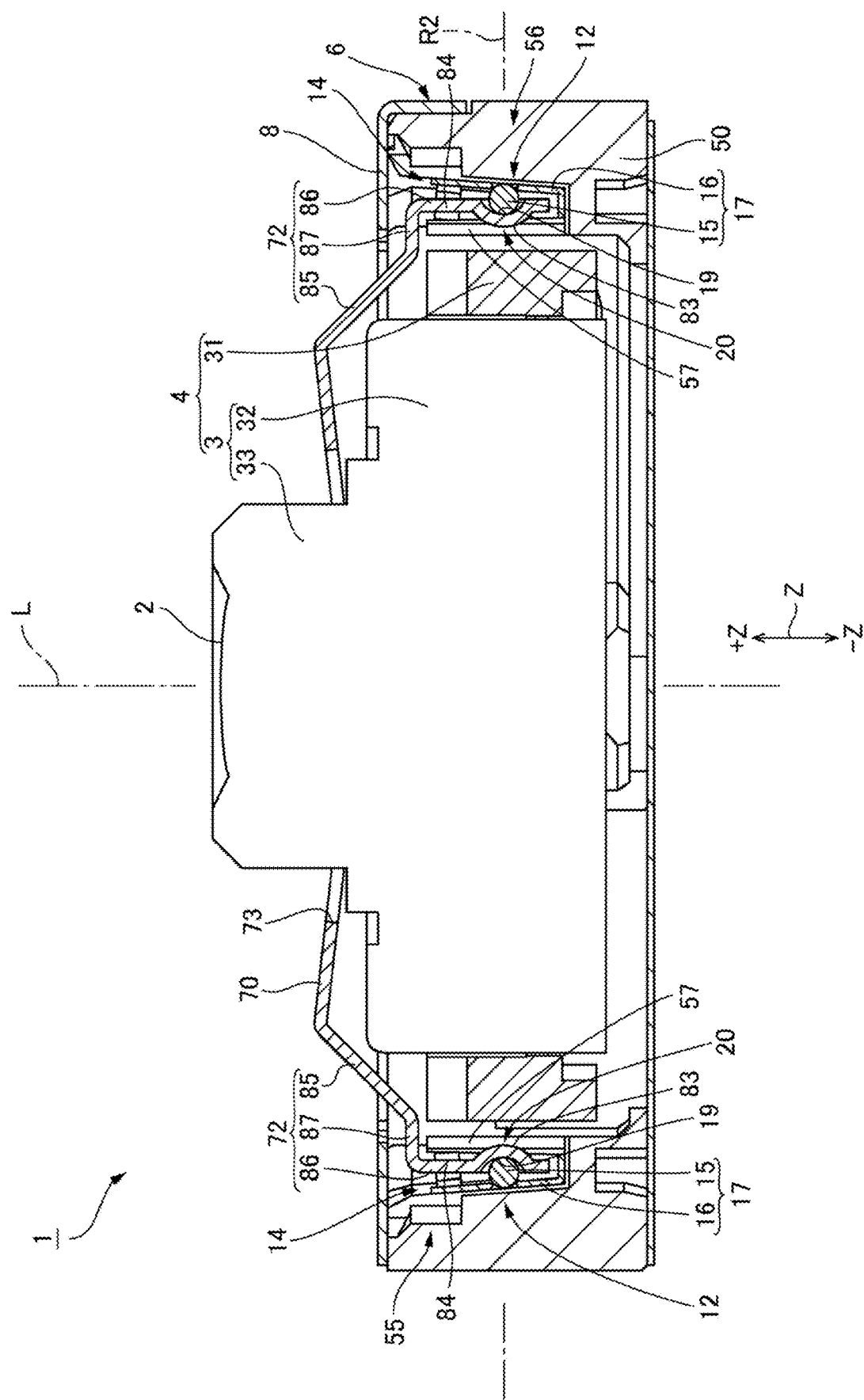
FIG. 6 is a cross-sectional view showing the optical unit with a shake correction function which is cut by the "B-B" line in FIG. 2.

FIG. 1 is a perspective view showing an optical unit with a shake correction function. FIG. 2 is a plan view showing an optical unit with a shake correction function in which a cover is detached and which is viewed from an object to be photographed side. FIG. 3 is an exploded perspective view showing an optical unit with a shake correction function. FIG. 4 is a perspective view showing a gimbal mechanism. FIG. 5 is a cross-sectional view showing the optical unit with a shake correction function which is cut by the "A-A" line in FIG. 2. In other words, FIG. 5 is a cross-sectional view showing the optical unit with a shake correction function which is cut along a first axis. FIG. 6 is a cross-sectional view showing the optical unit with a shake correction function which is cut by the "B-B" line in FIG. 2. In other words, FIG. 6 is a cross-sectional view showing the optical unit with a shake correction function which is cut along a second axis.

As shown in FIG. 1 and FIG. 2, an optical unit 1 with a shake correction function in this embodiment includes a camera module 3 including an optical element such as a lens 2. The optical unit 1 with a shake correction function is, for example, mounted on a cell phone with a camera and an imaging device such as a drive recorder, or an action camera mounted on a movement body such as a helmet, a bicycle, a radio-controlled helicopter or a wearable camera. In the optical device, when the optical device inclines at the time of photographing, the camera module 3 is inclined and a photographed image is disturbed. In order to avoid a photographed image being disturbed, the optical unit 1 with a shake correction function corrects an inclination of the camera module 3 based on acceleration, angular velocity, a shaking amount and the like detected by a detection means such as a gyroscope.

In the following descriptions, three axes perpendicular to each other are defined as an "X"-axis, a "Y"-axis and a "Z"-axis. Further, a direction along the "X"-axis is referred to as an "X"-axis direction, one side in the "X"-axis direction is referred to as a "−X" direction, and the other side is referred to as a "+X" direction. A direction along the "Y"-axis is referred to as a "Y"-axis direction, one side in the "Y"-axis direction is referred to as a "−Y" direction, and the other side is referred to as a "+Y" direction. A direction along the "Z"-axis is referred to as a "Z"-axis direction, one side in the "Z"-axis direction is referred to as a "−Z" direction (first direction), and the other side is referred to as a "+Z" direction (second direction). The "Z"-axis direction is an optical axis direction along an optical axis "L" of the camera module 3. The "−Z" direction is an image side of the camera module 3, and the "+Z" direction is an object side with respect to the camera module 3.

As shown in FIG. 1, the optical unit 1 with a shake correction function includes a movable body 4 including the camera module 3, a gimbal mechanism 5 which turnably supports the movable body 4, a fixed body 6 which supports the movable body 4 through the gimbal mechanism 5, a shake correction drive mechanism 7 structured to swing the movable body 4 with respect to the fixed body 6, and a cover 8 in a rectangular frame shape which covers the fixed body 6 from the "+Z" direction side. The optical unit 1 with a shake correction function swings the movable body 4 around two axes intersecting the optical axis "L" of the camera module 3 and intersecting each other to perform a shake correction. In this embodiment, the optical unit 1 with a shake correction function swings the movable body 4 around two axes which are perpendicular to the optical axis "L" of the camera module 3 and perpendicular to each other to perform a shake correction. In other words, in the optical unit 1 with a shake correction function, a shake correction around the "X"-axis and a shake correction around the "Y"-axis are performed and thereby, a shake correction in a pitching direction and a shake correction in a yawing direction are performed.

The movable body 4 is turnably supported around the first axis "R1" perpendicular to the optical axis "L" and is turnably supported around the second axis "R2" perpendicular to the optical axis "L" and the first axis "R1" by the gimbal mechanism 5. The first axis "R1" and the second axis "R2" are inclined by 45 degrees with respect to the "X"-axis and the "Y"-axis. The movable body 4 turns around the "X"-axis and around the "Y"-axis by combining a turning around the first axis "R1" and a turning around the second axis "R2".

As shown in FIG. 2 and FIG. 4, the gimbal mechanism 5 includes the gimbal frame 10, a first connection mechanism 11 provided at diagonal positions of the movable body 4 on the first axis "R1", and a second connection mechanism 12 provided at diagonal positions of the fixed body 6 on the second axis "R2". The gimbal frame 10 is a plate spring made of metal. The first connection mechanism 11 turnably connects the gimbal frame 10 with the movable body 4 around the first axis "R1". The second connection mechanism 12 turnably connects the gimbal frame 10 with the fixed body 6 around the second axis "R2".

The first connection mechanism 11 includes a gimbal frame receiving member 17 including a spherical body 15 made of metal and a thrust receiving member 16 made of metal to which the spherical body 15 is fixed, and a support part 20 including a concave curved face 19 contacting with the spherical body 15 in the gimbal frame 10. The gimbal frame receiving member 17 is held by a holding part 13 provided in the movable body 4. The second connection mechanism 12 includes a gimbal frame receiving member 17 including a spherical body 15 made of metal and a thrust receiving member 16 made of metal to which the spherical body 15 is fixed, and a support part 20 including a concave curved face 19 contacting with the spherical body 15 in the gimbal frame 10. The gimbal frame receiving member 17 is held by a holding part 14 provided in the fixed body 6.

In this embodiment, the gimbal frame receiving member 17 held by the holding part 13 of the movable body 4 and the gimbal frame receiving member 17 held by the holding part 14 of the fixed body 6 are the same member as each other and thus, they are described with the same reference sign. Further, the support part 20 of the gimbal frame 10 including the concave curved face 19, which contacts with the gimbal frame receiving member 17 held by the movable body 4, and the support part 20 of the gimbal frame 10 including the concave curved face 19, which contacts with the gimbal frame receiving member 17 held by the fixed body 6, have the same structure as each other and thus, they are described with the same reference sign.

As shown in FIG. 2, the shake correction drive mechanism 7 includes a first magnetic drive mechanism 7X structured to generate a drive force for turning the movable body 4 around the "X"-axis, and a second magnetic drive mechanism 7Y structured to generate a drive force for turning the movable body 4 around the "Y"-axis. The first magnetic drive mechanism 7X is disposed on the "−Y" direction side with respect to the movable body 4. The second magnetic drive mechanism 7Y is disposed on the "−X" direction side with respect to the movable body 4. As shown in FIG. 3, the first magnetic drive mechanism 7X includes a set of a magnet 25X and a coil 26X. The second magnetic drive mechanism 7Y includes a set of a magnet 25Y and a coil 26Y. The magnet 25X and the coil 26X of the first magnetic drive mechanism 7X face each other in the "Y"-axis direction. The magnet 25Y and the coil 26Y of the second magnetic drive mechanism 7Y face each other in the "X"-axis direction. In this embodiment, the magnets 25X and 25Y are disposed on the movable body 4 and the coils 26X and 26Y are disposed on the fixed body 6. In accordance with an embodiment of the present invention, it may be structured that the magnets 25X and 25Y are disposed on the fixed body 6 and the coils 26X and 26Y are disposed on the movable body 4.

(Movable Body)

As shown in FIG. 3 and FIG. 5, the movable body 4 includes the camera module 3 and a frame-shaped holder 31 which surrounds the camera module 3. The camera module 3 is provided with a main body part 32 whose shape when viewed in the "Z"-axis direction is octagonal and a lens-barrel part 33 which is protruded to the second direction from a center portion of the main body part 32. The camera module 3 includes a lens 2, which is held by the lens-barrel part 33, and an imaging element (not shown) which is accommodated in the main body part 32. The imaging element is disposed on the optical axis "L" of the lens 2. The holder 31 is made of resin.

As shown in FIG. 3, the holder 31 is provided with a first side plate part 35, which is extended in the "Y"-axis direction along a side face of the main body part 32 of the camera module 3 on the "−X" direction side of the camera module 3, and a second side plate part 36 which is extended in the "Y"-axis direction along a side face of the main body part 32 on the "+X" direction side of the camera module 3. Further, the holder 31 is provided with a third side plate part 37, which is extended in the "X"-axis direction along a side face of the main body part 32 on the "−Y" direction side of the camera module 3, and a fourth side plate part 38 which is extended in the "X"-axis direction along a side face of the main body part 32 on the "+Y" direction side of the camera module 3. In addition, the holder 31 is provided with a first corner part 39 which connects the first side plate part 35 with the third side plate part 37, and a second corner part 40 which connects the second side plate part 36 with the fourth side plate part 38. The first corner part 39 and the second corner part 40 are located at diagonal positions in the first axis "R1" direction. Further, the holder 31 is provided with a third corner part 41 which connects the first side plate part 35 with the fourth side plate part 38, and a fourth corner part 42 which connects the second side plate part 36 with the third side plate part 37. The third corner part 41 and the fourth corner part 42 are located at diagonal positions in the second axis "R2" direction. The third corner part 41 and the fourth corner part 42 are formed in a plate shape and are extended along a side face of the main body part 32.

The magnet 25Y of the second magnetic drive mechanism 7Y is fixed to an outer side face of the first side plate part 35 through a yoke member 44 in a plate shape. The magnet 25X of the first magnetic drive mechanism 7X is fixed to an outer side face of the third side plate part 37 through a yoke member 44 in a plate shape. The yoke member 44 is made of magnetic material. Each of the magnets 25X and 25Y is magnetized so that magnetic poles of a face directing to an outer side in the radial direction are different from each other with a magnetized polarizing line extended in a circumferential direction at a center in the "Z"-axis direction as a boundary.

Each of the first corner part 39 and the second corner part 40 is provided with the holding part 13 which holds the gimbal frame receiving member 17 of the first connection mechanism 11. Each of the holding parts 13 is a cut-out recessed part which is formed by cutting out from the "+Z" direction side of the holder 31 and from a side of the optical axis "L" (one side in the first axis "R1" direction). Each of the holding parts 13 is opened to the "+Z" direction and to an inner peripheral side in the first axis "R1" direction. Further, the holder 31 is provided at the first corner part 39 and the second corner part 40 with a pair of facing wall parts 45 which partly close an opening on an inner peripheral side of each of the holding parts 13.

(Fixed Body)

As shown in FIG. 3, the fixed body 6 includes a case 50 made of resin and the coils 26X and 26Y which are held by the case 50. The case 50 is formed in a rectangular frame shape surrounding an outer peripheral side of the movable body 4.

The case 50 is provided with a first frame part 51 extended in the "Y"-axis direction on the "−X" direction side of the movable body 4, a second frame part 52 extended in the "Y"-axis direction on the "+X" direction side of the movable body 4, a third frame part 53 extended in the "X"-axis direction on the "−Y" direction side of the movable body 4, and a fourth frame part 54 extended in the "X"-axis direction on the "+Y" direction side of the movable body 4. In the case 50, each of the first corner part 55 and the second corner part 56 which are located at diagonal positions in the second axis "R2" direction is provided with the holding part 14 which holds the gimbal frame receiving member 17 of the second connection mechanism 12. The first corner part 55 is a connected portion of the first frame part 51 with the fourth frame part 54, and the second corner part 56 is a connected portion of the third frame part 53 with the second frame part 52. Each of the holding parts 14 is a cut-out recessed part which is formed by cutting out from the "+Z" direction side of the case 50 and from a side of the optical axis "L" (one side in the second axis "R2" direction). Each of the holding parts 14 is opened to the "+Z" direction and to an inner peripheral side in the second axis "R2" direction. Further, the case 50 is provided at the first corner part 55 and the second corner part 56 with a pair of facing wall parts 57 which partly close an opening on an inner peripheral side of each of the holding parts 14.

As shown in FIG. 3, each of the first frame part 51 and the third frame part 53 is provided with a coil arrangement hole 58. Each of the coil arrangement holes 58 is a through hole, and the coil 26X of the first magnetic drive mechanism 7X and the coil 26Y of the second magnetic drive mechanism 7Y are respectively fixed to the coil arrangement holes 58 by an adhesive. Each of the coils 26X and 26Y is an air core coil in an elliptical shape which is long in a circumferential direction, and two long sides located on the "+Z" direction side and the "−Z" direction side are utilized as effective sides. A flexible printed circuit board 60 is fixed to outer sides in the radial direction of the first frame part 51 and the third frame part 53. The flexible printed circuit board 60 is provided with a first circuit board portion 61 which is overlapped with the coil arrangement hole 58 of the third frame part 53 from an outer side in the radial direction, and a second circuit board portion 62 which is overlapped with the coil arrangement hole 58 of the first frame part 51 from an outer side in the radial direction. The coil 26X is fixed to the first circuit board portion 61 and the coil 26Y is fixed to the second circuit board portion 62. The coil 26X and the coil 26Y are electrically connected with the flexible printed circuit board 60.

Rectangular magnetic plates 64 are respectively disposed between the first circuit board portion 61 and the coil 26X and between the second circuit board portion 62 and the coil 26Y. The magnetic plate 64 disposed between the first circuit board portion 61 and the coil 26X faces the magnet 25X to structure a magnetic spring for returning the movable body 4 to a turning reference position in a turning direction around the "X"-axis. Further, the magnetic plate 64 disposed between the second circuit board portion 62 and the coil 26Y faces the magnet 25Y to structure a magnetic spring for returning the movable body 4 to a turning reference position in a turning direction around the "Y"-axis. Further, a magnetic sensor 65 is disposed at positions overlapping with center holes of the coils 26X and 26Y. The magnetic sensor 65 is, for example, a Hall element. The optical unit 1 with a shake correction function detects a swing angle around the "X"-axis of the movable body 4 based on an output of the magnetic sensor 65 disposed at a center of the coil 26X. Further, a swing angle around the "Y"-axis of the movable body 4 is detected based on an output of the magnetic sensor 65 disposed at a center of the coil 26Y.

(Gimbal Frame)

As shown in FIG. 3 and FIG. 4, the gimbal frame 10 is provided with a gimbal frame main body part 70 in a substantially square shape when viewed in the "Z"-axis direction, first gimbal frame extended parts 71 which are bent to the "−Z" direction toward an outer side in the radial direction and extended in the "Z"-axis direction from diagonal positions in the first axis "R1" direction of the gimbal frame main body part 70, and second gimbal frame extended parts 72 which are bent to the "−Z" direction toward an outer side in the radial direction and extended in the "Z"-axis direction from diagonal positions in the second axis "R2" direction of the gimbal frame main body part 70. A center hole 73 which penetrates through the gimbal frame main body part 70 is provided at a center of the gimbal frame main body part 70. As shown in FIG. 2, the gimbal frame main body part 70 is overlapped with the main body part 32 of the camera module 3 when viewed in the "Z"-axis direction.

As shown in FIG. 4, the gimbal frame main body part 70 is provided with a center plate portion 75 in a rectangular shape which is extended in the first axis "R1" direction at a center in the second axis "R2" direction, and a pair of angular plate portions 76 in a trapezoid shape which are inclined to the "+Z" direction from the center plate portion 75 toward both sides in the second axis "R2" direction. In the gimbal frame main body part 70, the angular plate portions 76 in the second axis "R2" direction are separated from the movable body 4 compared with the center plate portion 75. Therefore, even in a case that the movable body 4 is turned around the first axis "R1" on the "−Z" direction side with respect to the gimbal frame 10 and both ends of the movable body 4 in the second axis "R2" direction are moved in the "Z"-axis direction, a collision of the movable body 4 with the gimbal frame 10 can be avoided.

As shown in FIG. 3 and FIG. 5, the first gimbal frame extended part 71 is provided with a first extended portion 81 of the first gimbal frame extended part 71 which is inclined to the first direction side from the center plate portion 75 of the gimbal frame main body part 70 toward the first axis "R1" direction, and a second extended portion 82 of the first gimbal frame extended part 71 which is extended in the "Z"-axis direction on the first direction side of the first extended portion 81 of the first gimbal frame extended part 71. The first gimbal frame extended part 71 is provided with a support part 20 structuring the first connection mechanism 11 at a tip end on the first direction side of the second extended portion 82 of the first gimbal frame extended part 71. The support part 20 is provided with a concave curved face 19 which is recessed to an inner side in the radial direction at a center portion in a circumferential direction of the outer side end face in the radial direction. Further, the support part 20 is provided with a convex curved face 83 which is protruded to an inner side in the radial direction at the center portion in the circumferential direction of the inner side end face in the radial direction. The convex curved face 83 is formed on an end face opposite to the end face where the concave curved face 19 is formed when the concave curved face 19 is formed in the second extended portion 82 of the first gimbal frame extended part 71 by press working, and the convex curved face 83 is provided at a position corresponding to the concave curved face 19. In this embodiment, a curvature radius of the concave curved face 19 is larger than a curvature radius of the spherical body 15 structuring the first connection mechanism 11. Further, the second extended portion 82 of the first gimbal frame extended part 71 is provided with a passing part 84 whose width in the circumferential direction is narrower than the support part 20 on the "+Z" direction side with respect to the support part 20.

As shown in FIG. 3 and FIG. 6, the second gimbal frame extended part 72 is provided with a first extended portion 85 of the second gimbal frame extended part 72 which is inclined to the first direction side from each of a pair of the angular plate portions 76 of the gimbal frame main body part 70 toward the second axis "R2" direction, a second extended portion 86 of the second gimbal frame extended part 72 which is extended in the "Z"-axis direction from an end on the first direction side of the first extended portion 85 of the second gimbal frame extended part 72, and a third extended portion 87 of the second gimbal frame extended part 72 which is extended to the second axis "R2" direction between the first extended portion 85 and the second extended portion 86 and connects the first extended portion 85 with the second extended portion 86. The second gimbal frame extended part 72 is provided with a support part 20 structuring the second connection mechanism 12 at a tip end on the first direction side of the second extended portion 86 of the second gimbal frame extended part 72. The support part 20 is provided with a concave curved face 19 which is recessed to an inner side in the radial direction at a center portion in a circumferential direction of the outer side end face in the radial direction. Further, the support part 20 is provided with a convex curved face 83 which is protruded to an inner side in the radial direction at a center portion in the circumferential direction of the inner side end face in the radial direction. The convex curved face 83 is formed on an end face opposite to the end face where the concave curved face 19 is formed when the concave curved face 19 is formed in the support part 20 by press working, and the convex curved face 83 is provided at a position corresponding to the concave curved face 19. In this embodiment, a curvature radius of the concave curved face 19 is larger than a curvature radius of the spherical body 15 structuring the second connection mechanism 12. Further, the second extended portion 86 of the second gimbal frame extended part 72 is provided with a passing part 84 whose width in the circumferential direction is narrower than the support part 20 on the "+Z" direction side with respect to the support part 20.

In this embodiment, the support part 20 of each of the first gimbal frame extended parts 71 is contacted with the spherical body 15 of the gimbal frame receiving member 17 which is held by each of the holding parts 13 of the movable body 4. As a result, as shown in FIG. 2 and FIG. 5, the first connection mechanism 11 is structured which turnably connects the gimbal frame 10 with the movable body 4 around the first axis "R1". More specifically, as shown in FIG. 5, the holding part 13 of the movable body 4 holds the gimbal frame receiving member 17 at a position where the first axis "R1" passes a center of the spherical body 15. The spherical body 15 is partly inserted to the concave curved face 19 of the support part 20 of the first gimbal frame extended part 71 in the first axis "R1" direction. As a result, the concave curved face 19 and the spherical body 15 are set in a point contact state on the first axis "R1" line and thereby, the movable body 4 and the gimbal frame 10 are connected with each other in a turnable state around the first axis "R1" line.

Further, the support part 20 of the second gimbal frame extended part 72 is contacted with the spherical body 15 of the gimbal frame receiving member 17 which is held by the holding part 14 of the fixed body 6. As a result, as shown in FIG. 2 and FIG. 6, the second connection mechanism 12 is structured which turnably connects the gimbal frame 10 with the fixed body 6 around the second axis "R2". More specifically, as shown in FIG. 6, the holding part 14 of the fixed body 6 holds the gimbal frame receiving member 17 at a position where the second axis "R2" passes a center of the spherical body 15. The spherical body 15 is partly inserted to the concave curved face 19 of the support part 20 of the second gimbal frame extended part 72 in the second axis "R2" direction. As a result, the concave curved face 19 and the spherical body 15 are set in a point contact state on the second axis "R2" line and thereby, the fixed body 6 and the gimbal frame 10 are connected with each other in a turnable state around the second axis "R2" line.

(Detail of First Connection Mechanism and Second Connection Mechanism)

Figure 7:
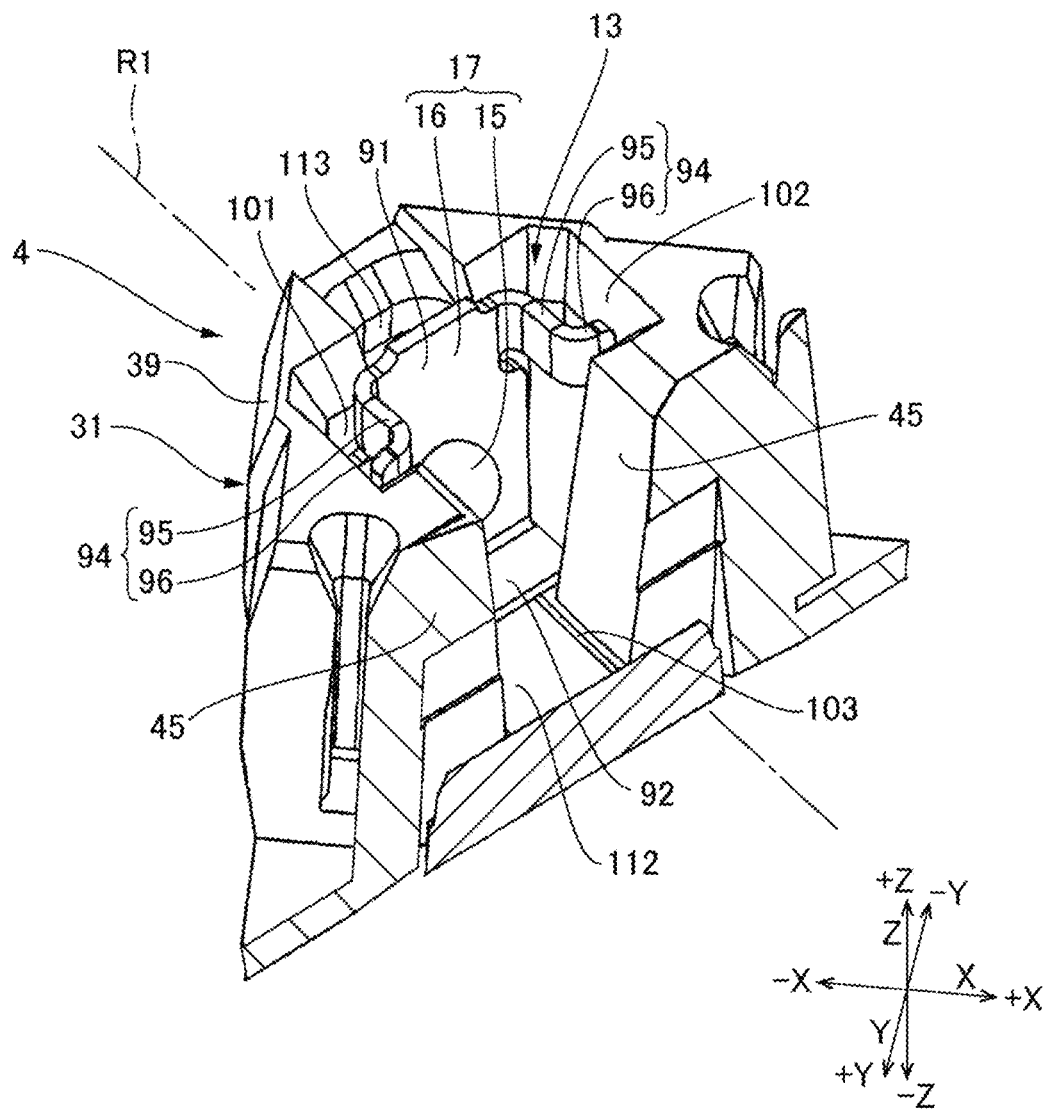
FIG. 7 is a perspective view showing a holding part of a movable body which holds a gimbal frame receiving member.
Figure 8:
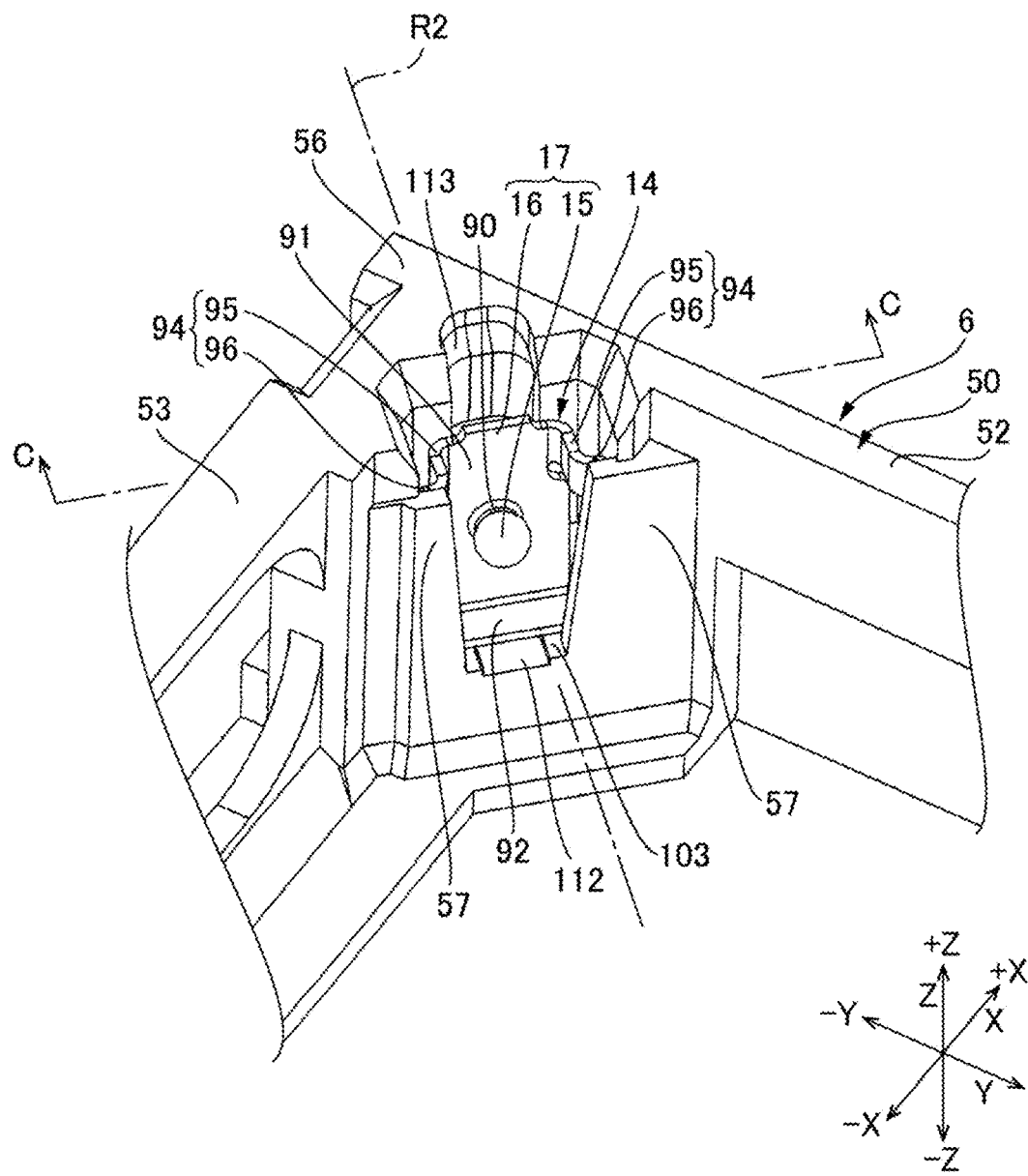
FIG. 8 is a perspective view showing a holding part of a fixed body which holds a gimbal frame receiving member.
Figure 9:
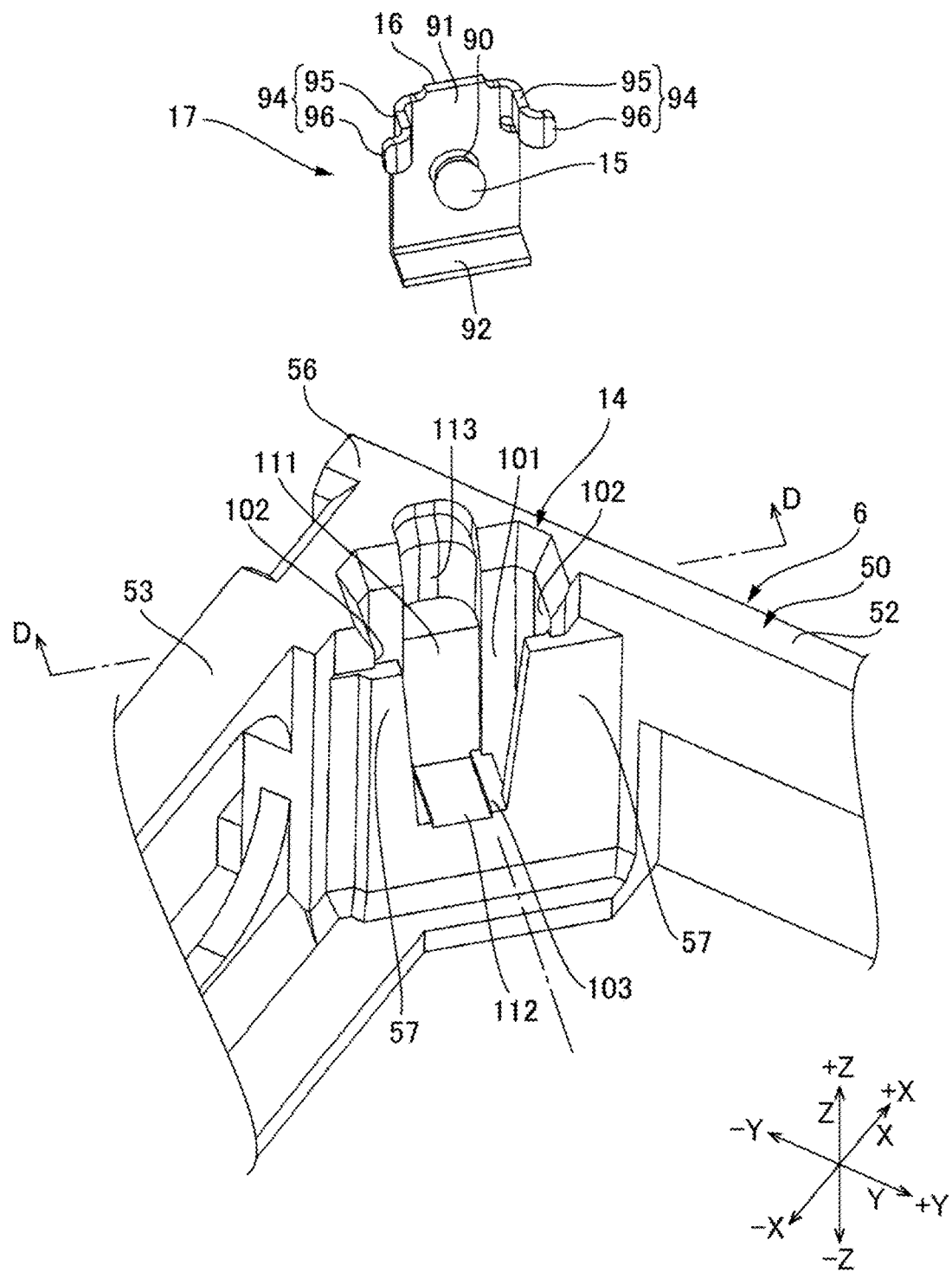
FIG. 9 is an exploded perspective view showing a gimbal frame receiving member and a holding part.
Figure 10:
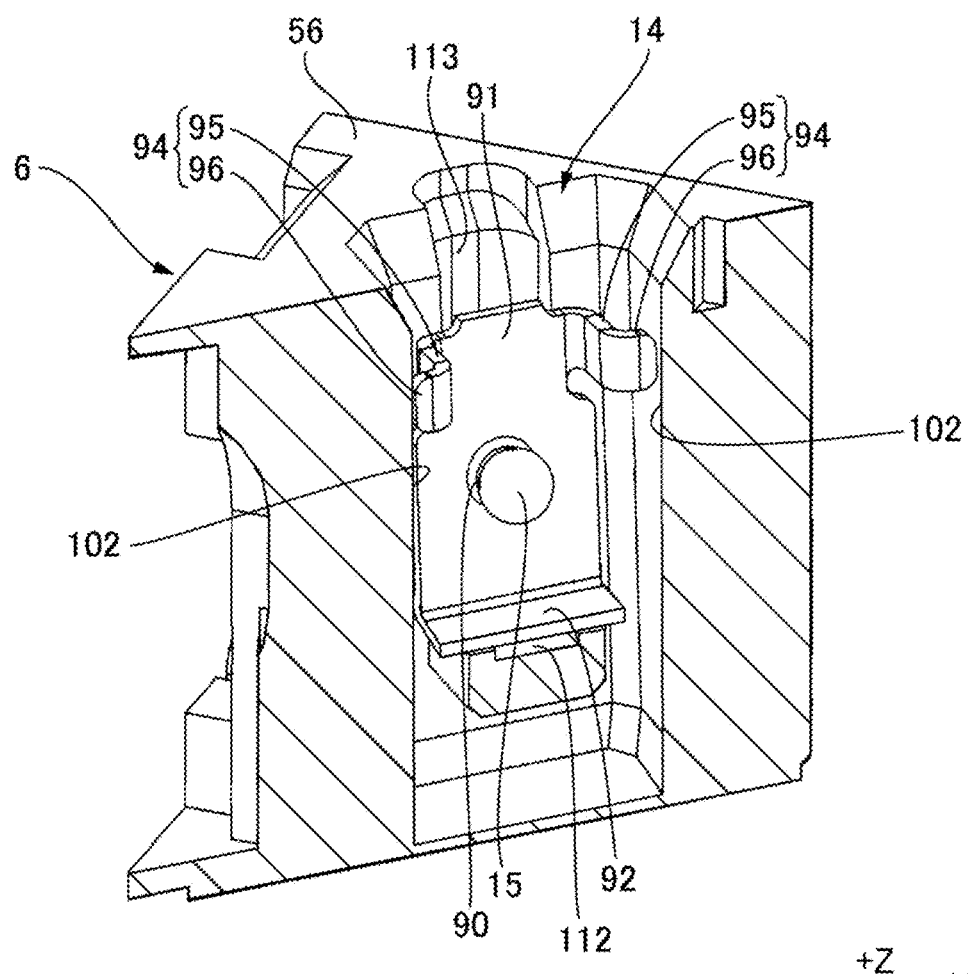
FIG. 10 is a cross-sectional view showing the holding part of a fixed body which is cut by the "C-C" line in FIG. 8.
Figure 11:
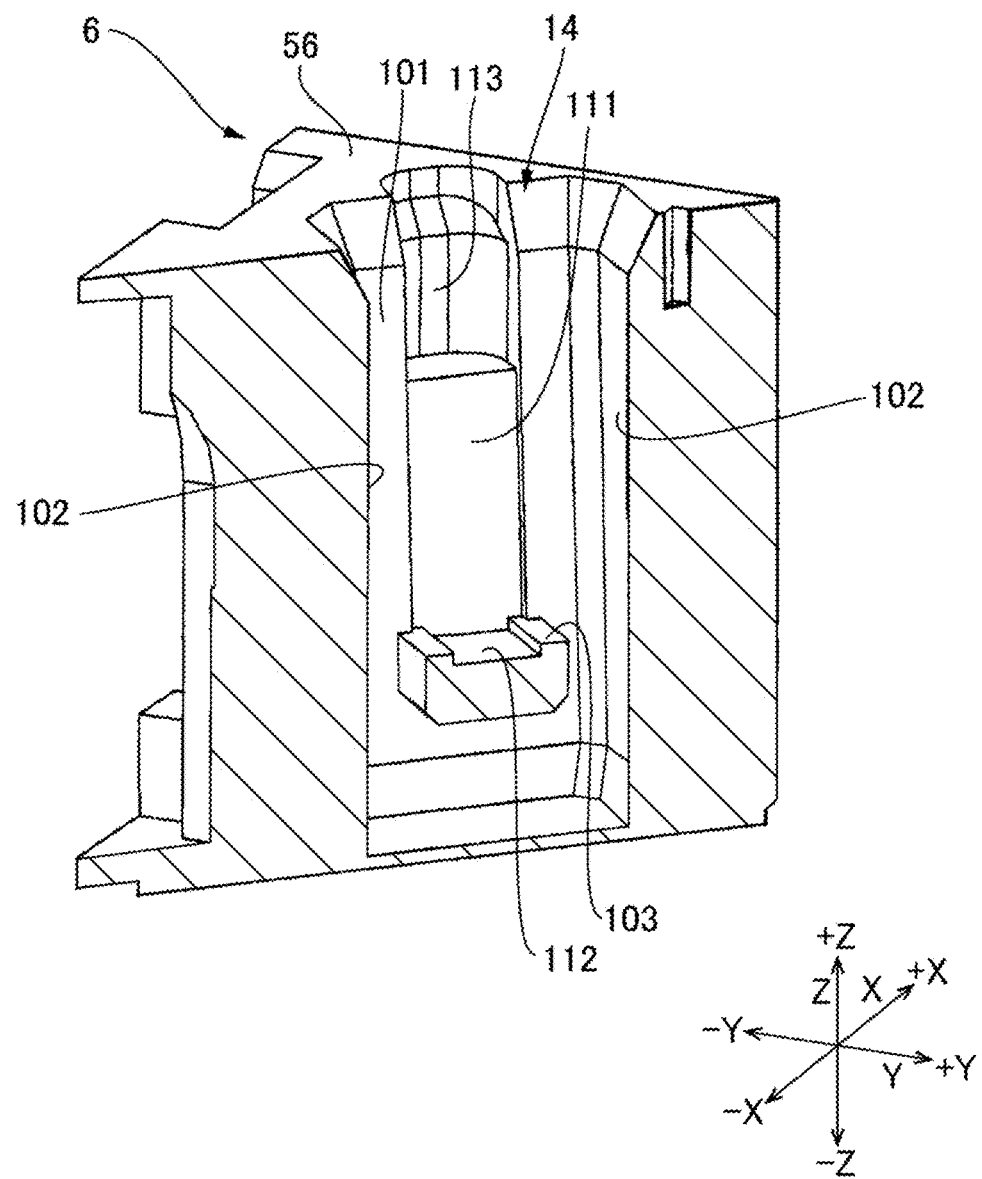
FIG. 11 is a cross-sectional view showing the holding part which is cut by the "D-D" line in FIG. 9.
Figure 12:
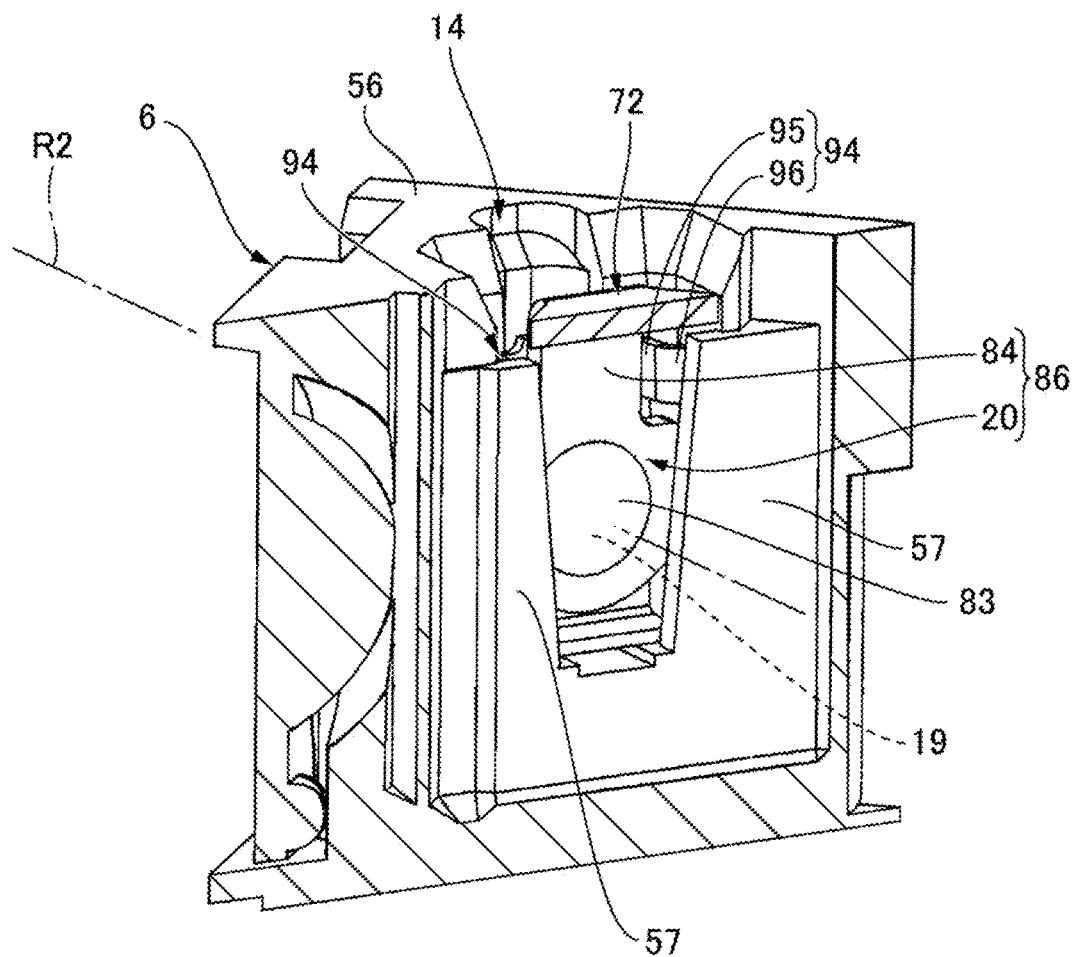
FIG. 12 is a cross-sectional view showing a portion which is cut by the "E-E" line in FIG. 2.
Figure 13:
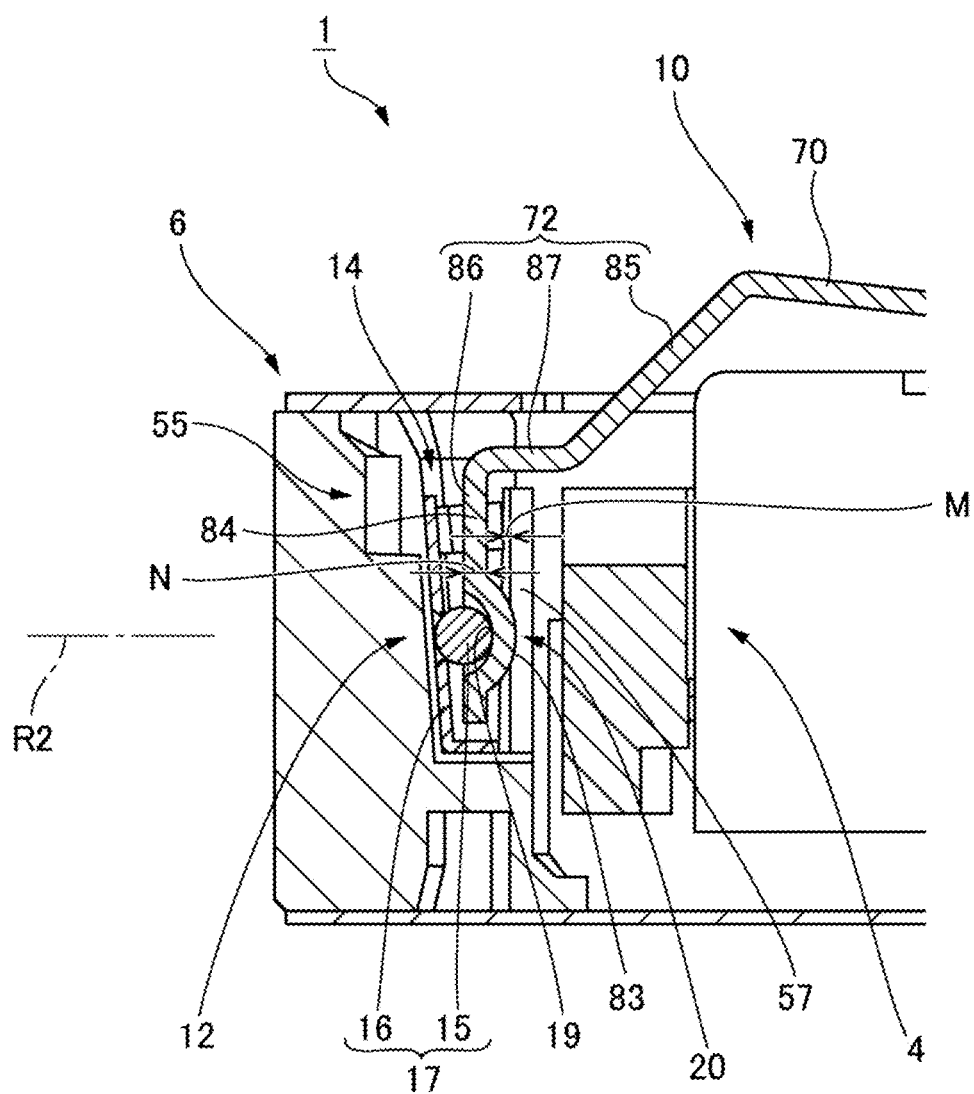
FIG. 13 is an explanatory view showing a separated distance between a facing wall part of a fixed body and a thrust receiving member.
Figure 14:
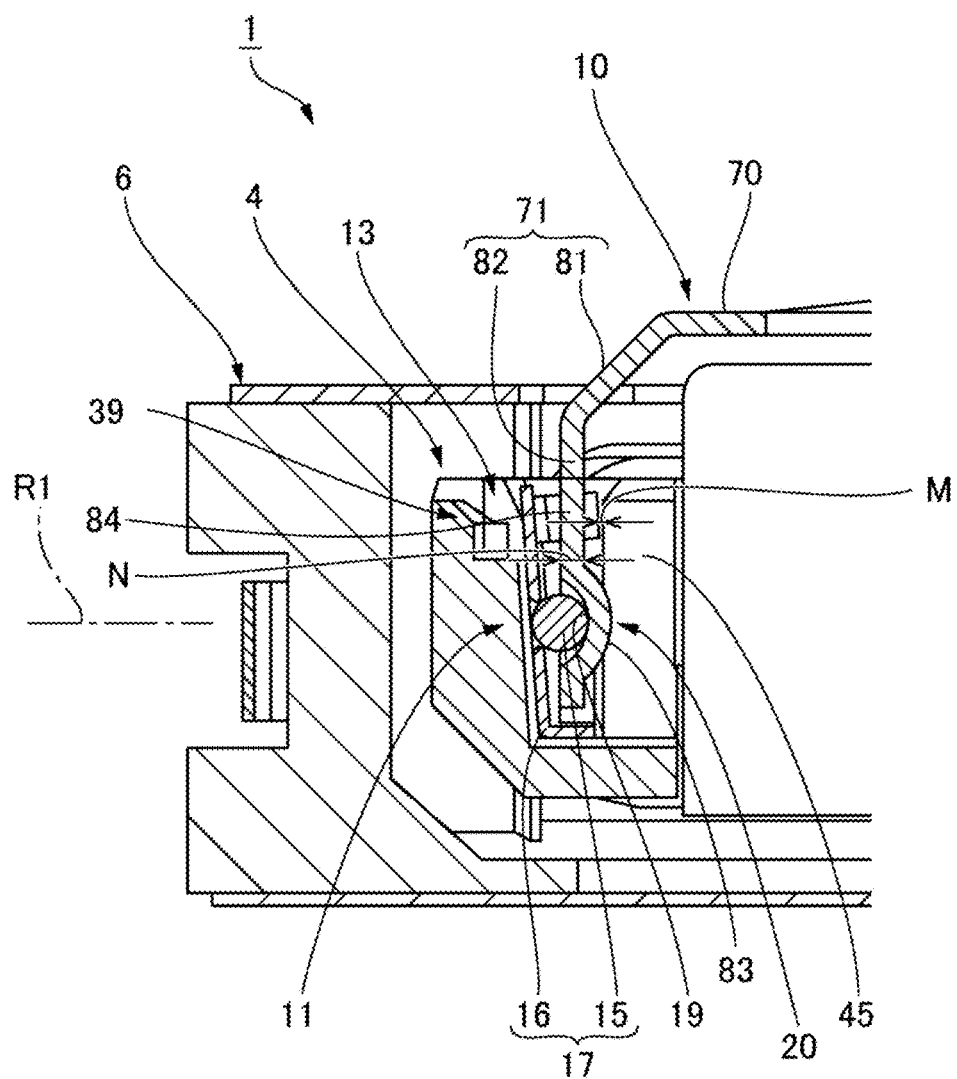
FIG. 14 is an explanatory view showing a separated distance between a facing wall part of a movable body and a thrust receiving member.

Next, the first connection mechanism 11 and the second connection mechanism 12 will be further described in detail below. FIG. 7 is a perspective view showing the holding part 13 of the movable body 4 which holds the gimbal frame receiving member 17. FIG. 7 is a view showing the first corner part 39 in the first axis "R1" direction of the holder 31 of the movable body 4 which is cut by a plane perpendicular to the first axis "R1". FIG. 8 is a perspective view showing the holding part 14 of the fixed body 6 which holds the gimbal frame receiving member 17. FIG. 8 is a view showing the holding part 14 of the fixed body 6 which is viewed from an inner peripheral side where the optical axis "L" is located. FIG. 9 is a perspective view showing a state that the gimbal frame receiving member 17 is detached from the holding part 14 of the fixed body 6. FIG. 10 is a cross-sectional view showing the holding part 14 which is cut by the "C-C" line in FIG. 8. FIG. 11 is a cross-sectional view showing the holding part 14 which is cut by the "D-D" line in FIG. 9. FIG. 12 is a cross-sectional view showing a portion which is cut by the "E-E" line in FIG. 2. FIG. 13 is an explanatory view showing a separated distance between the facing wall part of the fixed body 6 and a pair of the protruded parts of the thrust receiving member 16. FIG. 14 is an explanatory view showing a separated distance between the facing wall part of the movable body 4 and a pair of the protruded parts of the thrust receiving member 16.

The first connection mechanism 11 and the second connection mechanism 12 are provided with structures corresponding to each other. In other words, although the holding part 13 of the movable body 4 is structured on the first axis "R1" and the holding part 14 of the fixed body 6 is structured on the second axis "R2", the respective holding parts 13 and 14 are similarly structured except the above-mentioned arrangement. Further, the gimbal frame receiving members 17 which are held by the respective holding parts 13 and 14 are the same member as each other. Therefore, in the following descriptions, the second connection mechanism 12 which connects the fixed body 6 with the gimbal frame 10 will be described. Regarding the first connection mechanism 11 which connects the movable body 4 with the gimbal frame 10, the same reference signs are used in the structures corresponding to the second connection mechanism 12 in FIG. 8 and their descriptions are omitted.

(Gimbal Frame Receiving Member)

As shown in FIG. 8 and FIG. 9, the gimbal frame receiving member 17 includes the spherical body 15 made of metal and the thrust receiving member 16 made of metal to which the spherical body 15 is fixed. As shown in FIG. 9, the thrust receiving member 16 is provided with a plate part 91 including a spherical body fixing part 90 to which the spherical body 15 is fixed and a bent plate part 92 which is bent at a right angle in the first axis "R1" direction from an end on the first direction side of the plate part 91. As shown in FIG. 4, the plate part 91 faces the support part 20 of the second gimbal frame extended part 72 through the spherical body 15 in the second axis "R2" direction. The bent plate part 92 is located on the "−Z" direction side with respect to the support part 20 and faces the support part 20 in the "Z"-axis direction.

The plate part 91 is formed in a rectangular shape as a whole which is long in the "Z"-axis direction. The spherical body fixing part 90 is a circular through hole which is provided in a circumferential direction of the plate part 91. An inside diameter dimension of the through hole is shorter than a diameter of the spherical body 15. The spherical body 15 is fixed to the thrust receiving member 16 by welding in a state that the spherical body 15 is partly inserted to the spherical body fixing part 90.

In addition, the thrust receiving member 16 is provided with a pair of protruded parts 94 which are protruded in the second axis "R2" direction to a side where the support part 20 is located from both ends in the circumferential direction on the "+Z" direction side with respect to the spherical body fixing part 90 of the plate part 91. A pair of the protruded parts 94 faces each other in the circumferential direction. As shown in FIG. 9, each of a pair of the protruded parts 94 is provided with a protruded plate portion 95, which is bent in the second axis "R2" direction from an end in the circumferential direction of the plate part 91, and an extended plate portion 96 which is bent from an end of the protruded plate portion 95 on an opposite side to the plate part 91 to an opposite side to the plate part 91 in the circumferential direction.

Next, as shown in FIG. 11, the holding part 14 is a cut-out recessed part which is provided with a rear wall face 101, which is enlarged in the "Z"-axis direction and in the circumferential direction, a pair of side wall faces 102 which are extended in the "Z"-axis direction and face each other in the circumferential direction on both sides in the circumferential direction of the rear wall face 101, and a bottom wall face 103 which is extended in the second axis "R2" direction on the "−Z" direction side of the rear wall face 101. The holding part 14 is opened to the "+Z" direction side and to an inner peripheral side in the second axis "R2" direction (side of the optical axis "L").

As shown in FIG. 11, a center portion in the circumferential direction of the rear wall face 101 is provided with a first groove 111 for filling an adhesive. A center portion in the circumferential direction of the bottom wall face 103 is provided with a second groove 112 for applying an adhesive. An end portion on the "+Z" direction side of the first groove 111 is formed with an adhesive injection part 113 which is deep to an outer side in the radial direction. The first groove 111 and the second groove 112 are communicated with each other.

In this embodiment, when the optical unit 1 with a shake correction function is to be assembled, the gimbal frame receiving member 17 is, as shown in FIG. 4, set so that the concave curved face 19 of the support part 20 of the second gimbal frame extended part 72 is brought into contact with the spherical body 15, and the gimbal frame receiving member 17 is inserted into the holding part 14 together with the second extended portion 86 of the second gimbal frame extended part 72.

In a state that the concave curved face 19 of the support part 20 of the second gimbal frame extended part 72 and the spherical body 15 are contacted with each other, the second extended portion 86 of the second gimbal frame extended part 72 is extended in the "Z"-axis direction between a pair of the protruded parts 94. More specifically, as shown in FIG. 4, the support part 20 provided at a tip end on the "−Z" direction side of the second extended portion 86 of the second gimbal frame extended part 72 is located on the "−Z" direction side with respect to a pair of the protruded parts 94, and the passing part 84 is located between a pair of the protruded parts 94. In this embodiment, a width dimension in the circumferential direction of the support part 20 is longer than a width dimension in the circumferential direction of the passing part 84 and is longer than a space between a pair of the protruded parts 94. Therefore, when viewed in the "Z"-axis direction, a pair of the protruded parts 94 is overlapped with both end portions in the circumferential direction of the support part 20.

When the gimbal frame receiving member 17 is inserted into the holding part 14 from the "+Z" direction side together with the second extended portion 86 of the second gimbal frame extended part 72 and the thrust receiving member 16 is held by the holding part 14, as shown in FIG. 10, the rear wall face 101 is contacted with the plate part 91 of the thrust receiving member 16 from an opposite side to the support part 20 of the gimbal frame 10. A pair of the side wall faces 102 is located on both sides in the circumferential direction of the plate part 91. Tip ends of the extended plate portions 96 of a pair of the protruded parts 94 are respectively contacted with opening side face portions of a pair of the side wall faces 102. The bottom wall face 103 is contacted with the bent plate part 92 from the "−Z" direction side. In this embodiment, the first groove 111 and the second groove 112 are filled with an adhesive. The thrust receiving member 16 is fixed to the holding part 14 by an adhesive which is filled in the first groove 111 and the second groove 112.

In this embodiment, in a state that the gimbal frame receiving member 17 is inserted into the holding part 14 together with the second extended portion 86 of the second gimbal frame extended part 72 to structure the second connection mechanism 12, the gimbal frame 10 is set in a state that a pair of the second gimbal frame extended parts 72 is resiliently bent in a direction approaching each other in the second axis "R2" direction. In other words, each of a pair of the second gimbal frame extended parts 72 is contacted with the spherical body 15 in a state that the second gimbal frame extended part 72 is resiliently bent to a side of the optical axis "L". As a result, each of the support parts 20 of a pair of the second gimbal frame extended parts 72 is urged by a shape restoring force of the gimbal frame 10 to the gimbal frame receiving member 17 which is held by the holding part 14. Therefore, contacting of the spherical body 15 with the concave curved face 19 is maintained.

In this embodiment, as shown in FIGS. 8, FIG. 9 and FIG. 14, the fixed body 6 is provided with a pair of the facing wall parts 57 which partly close an opening of the holding part 14 in the second axis "R2" direction from both sides in the circumferential direction. A space is formed in the circumferential direction between a pair of the facing wall parts 57. A face on an outer side in the radial direction of each of the facing wall parts 57 is connected with an end on an inner peripheral side of each of a pair of the side wall faces 102 in the second axis "R2" direction. Further, an end on the "−Z" direction side of the face on the outer side in the radial direction of each of the facing wall parts 57 is connected with the bottom wall face 103.

As shown in FIG. 8, a pair of the facing wall parts 57 faces a pair of the protruded parts 94 of the thrust receiving member 16, both side portions of the convex curved face 83 in the support part 20 of the second gimbal frame extended part 72, and the bent plate part 92 of the thrust receiving member 16 in the second axis "R2" direction. As shown in FIG. 13, in the second axis "R2" direction, a separated distance "M" between tip ends of a pair of the protruded parts 94 and the facing wall parts 57, in other words, the separated distance "M" between a pair of the facing wall parts 57 and a pair of the protruded parts 94 is shorter than a thickness dimension "N" of the support part 20 of the second gimbal frame extended part 72 in the second axis "R2" direction.

Further, as shown in FIG. 2, in a state that the gimbal frame receiving member 17 held by the holding part 14 and the support part 20 of the second gimbal frame extended part 72 are connected with each other in the second axis "R2" direction, the convex curved face 83 provided on an end face on an inner side in the radial direction of the support part 20 is located between a pair of the facing wall parts 57 in the circumferential direction.

In this embodiment, as shown in FIG. 7, the movable body 4 is also provided with a pair of facing wall parts 45 which partly close an opening of the holding part 13 in the first axis "R1" direction from both sides in the circumferential direction. A pair of the facing wall parts 45 is similarly structured to a pair of the facing wall parts 57 in the fixed body 6. In other words, a space is formed between a pair of the facing wall parts 45 in the circumferential direction. A face on an outer side in the radial direction of each of the facing wall parts 45 is connected with an end on an inner peripheral side of each of a pair of the side wall faces 102 in the first axis "R1" direction. Further, an end on the "−Z" direction side of the face on the outer side in the radial direction of each of the facing wall parts 45 is connected with the bottom wall face 103.

A pair of the facing wall parts 45 faces a pair of the protruded parts 94 of the thrust receiving member 16, both side portions of the convex curved face 83 in the support part 20 of the first gimbal frame extended part 71, and the bent plate part 92 of the thrust receiving member 16 in the first axis "R1" direction. As shown in FIG. 14, in the first axis "R1" direction, a separated distance "M" between tip ends of a pair of the protruded parts 94 and the facing wall parts 45, in other words, the separated distance "M" between a pair of the facing wall parts 45 and a pair of the protruded parts 94 is shorter than a thickness dimension "N" of the first gimbal frame extended part 71 in the first axis "R1" direction. In a state that the gimbal frame receiving member 17 held by the holding part 13 and the support part 20 of the first gimbal frame extended part 71 are connected with each other in the first axis "R1" direction, the convex curved face 83 provided on an end face on an inner side in the radial direction of the support part 20 is located between a pair of the facing wall parts 45 in the circumferential direction.

(Operations and Effects)

In this embodiment, the first connection mechanism 11 which turnably connects the movable body 4 with the gimbal frame 10 around the first axis "R1" includes the spherical body 15 fixed to the movable body 4 through the thrust receiving member 16 and the concave curved face 19 provided in the support part 20 of the gimbal frame 10. The thrust receiving member 16 is held by the holding part 13 of the movable body 4, and the holding part 13 is structured to open to the "+Z" direction and to one side in the first axis "R1" direction. In this embodiment, the thrust receiving member 16 is provided with a pair of the protruded parts 94 on the "+Z" direction side with respect to the support part 20. On the other hand, the support part 20 of the first gimbal frame extended part 71 is overlapped with a pair of the protruded parts 94 when viewed in the "Z"-axis direction. Therefore, even when an impact is applied from the outside, the support part 20 of the gimbal frame 10 is prevented from being moved to the "+Z" direction with respect to a pair of the protruded parts 94. Further, the movable body 4 is provided with the facing wall parts 45 which face the protruded parts 94 from one side in the first axis "R1" direction to which the holding part 13 is opened, and the separated distance "M" between the facing wall parts 45 and a pair of the protruded parts 94 is narrower than a thickness in the first axis "R1" direction of the support part 20. Therefore, when an impact is applied from the outside, even in a case that the gimbal frame 10 is resiliently bent and the support part 20 is separated from the plate part 91, the support part 20 is prevented or suppressed from coming off from the tip end sides of the protruded parts 94 to the "+Z" direction.

Similarly, the second connection mechanism 12 which turnably connects the fixed body 6 with the gimbal frame 10 around the second axis "R2" includes the spherical body 15 fixed to the fixed body 6 through the thrust receiving member 16 and the concave curved face 19 provided in the support part 20 of the gimbal frame 10. The thrust receiving member 16 is held by the holding part 14 of the fixed body 6, and the holding part 14 is structured to open to the "+Z" direction and to one side in the second axis "R2" direction. In this embodiment, the thrust receiving member 16 is provided with a pair of the protruded parts 94 on the "+Z" direction side with respect to the support part 20. On the other hand, the support part 20 of the second gimbal frame extended part 72 is overlapped with a pair of the protruded parts 94 when viewed in the "Z"-axis direction. Therefore, even when an impact is applied from the outside, the support part 20 of the gimbal frame 10 is prevented from being moved to the "+Z" direction with respect to a pair of the protruded parts 94. Further, the fixed body 6 is provided with the facing wall parts 57 which face the protruded parts 94 from one side in the second axis "R2" direction to which the holding part 14 is opened, and the separated distance "M" between the facing wall parts 57 and a pair of the protruded parts 94 is narrower than a thickness in the second axis "R2" direction of the support part 20. Therefore, when an impact is applied from the outside, even in a case that the gimbal frame 10 is resiliently bent and the support part 20 is separated from the plate part 91, the support part 20 is prevented or suppressed from coming off from the tip end sides of the protruded parts 94 to the "+Z" direction.

Further, each of a pair of the protruded parts 94 of the thrust receiving member 16 is provided with the protruded plate portion 95, which is bent in the first axis "R1" direction from an end in the circumferential direction of the plate part 91, and the extended plate portion 96 which is bent from an end of the protruded plate portion 95 on an opposite side to the plate part 91 to an opposite side to the plate part 91 in the circumferential direction. Therefore, areas that the protruded parts 94 and the respective facing wall parts 45 and 57 face each other can be increased. Accordingly, the respective support parts 20 provided in the gimbal frame 10 are prevented from passing through between the protruded parts 94 and the facing wall parts 45 and 57 and prevented from coming off to the "+Z" direction.

Further, a pair of the facing wall parts 57 of the fixed body 6 faces end portions in the circumferential direction of the support part 20 of the second gimbal frame extended part 72. A pair of the facing wall parts 45 of the movable body 4 faces end portions in the circumferential direction of the support part 20 of the first gimbal frame extended part 71. Therefore, even when the gimbal frame 10 is resiliently bent, each of the support parts 20 is prevented from excessively separating from the plate part 91 of the thrust receiving member 16 to a side of the optical axis "L". In other words, when the gimbal frame 10 is resiliently bent, a movable range of the support part 20 can be restricted narrowly. As a result, the support part 20 is prevented from colliding with other members located on an inner peripheral side with respect to the support part 20.

In this embodiment, the support part 20 is provided with the convex curved face 83 corresponding to the concave curved face 19 on an end face on an opposite side to the spherical body 15. However, the convex curved face 83 is located between a pair of the facing wall parts 45 or a pair of the facing wall parts 57 in the circumferential direction. Therefore, even when the support part 20 is provided with the convex curved face 83, a pair of the protruded parts 94 and a pair of the facing wall parts 45 and 57 can be provided at comparatively close positions.

Further, each of a pair of the facing wall parts 45 provided in the movable body 4 faces the bent plate part 92 of the thrust receiving member 16. As a result, in this embodiment, a pair of the facing wall parts 45 faces, in the first axis "R1" direction, a pair of the protruded parts 94 of the thrust receiving member 16, both side portions of the convex curved face 83 in the support part 20 of the first gimbal frame extended part 71, and the bent plate part 92 of the thrust receiving member 16. Therefore, even when an impact is applied from the outside, the thrust receiving member 16 is prevented from coming off from the opening in the first axis "R1" direction of the holding part 14 which is a cut-out recessed part. Similarly, each of a pair of the facing wall parts 57 provided in the fixed body 6 faces the bent plate part 92 of the thrust receiving member 16. As a result, in this embodiment, a pair of the facing wall parts 57 faces, in the second axis "R2" direction, a pair of the protruded parts 94 of the thrust receiving member 16, both side portions of the convex curved face 83 in the support part 20 of the second gimbal frame extended part 72, and the bent plate part 92 of the thrust receiving member 16. Therefore, even when an impact is applied from the outside, the thrust receiving member 16 is prevented from coming off from the opening in the second axis "R2" direction of the holding part 14 which is a cut-out recessed part.

(Modified Embodiments)

In this embodiment, a pair of the facing wall parts 45 and 57 may be provided at least at positions facing a pair of the protruded parts 94 of the thrust receiving member 16. In other words, in the pairs of the facing wall parts 45 and 57, wall portions facing the first gimbal frame extended part 71 and the second gimbal frame extended part 72 and wall portions facing the bent plate parts 92 may be omitted.

Further, the pairs of the facing wall parts 45 and 57 may be continuously formed in the circumferential direction. In other words, each of the pairs of the facing wall parts 45 and 57 may be formed of one facing wall part. In this case, the one facing wall part closes an opening on an inner peripheral side of each of the holding parts 13 and 14 from an inner peripheral side.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with a shake correction function comprising:
    a movable body comprising a camera module;
    a gimbal mechanism structured to swingably support the movable body around a first axis intersecting an optical axis of the camera module and swingably support the movable body around a second axis intersecting the optical axis and the first axis; and
    a fixed body which supports the movable body through the gimbal mechanism;
    wherein the gimbal mechanism comprises a gimbal frame and a connection mechanism structured to turnably connect the gimbal frame with the movable body around the first axis;
    wherein the connection mechanism comprises:
        a gimbal frame receiving member comprising a spherical body and a thrust receiving member made of metal to which the spherical body is fixed; and
        a support part of the gimbal frame comprising a concave curved face which is contacted with the spherical body;
    wherein the movable body comprises a holding part which holds the gimbal frame receiving member at a position where the first axis passes through a center of the spherical body;
    wherein in a case that a direction along the optical axis is referred to as an optical axis direction, one side in the optical axis direction is referred to as a first direction side, an other side in the optical axis direction is referred to as a second direction side, a direction along the first axis is referred to as a first axis direction, and a direction around the optical axis is referred to as a circumferential direction,
    the thrust receiving member comprises:
        a plate part which comprises a spherical body fixing part to which the spherical body is fixed and faces the support part in the first axis direction through the spherical body; and
        a pair of protruded parts which are protruded to a side where the support part is located from both ends in the circumferential direction on the second direction side with respect to the spherical body fixing part of the plate part, the pair of the protruded parts facing each other in the circumferential direction;
    the holding part is formed in a cut-out recessed part comprising:
        a rear wall face which is contacted with the plate part from an opposite side to the support part in the first axis direction;
        a pair of side wall faces which are extended in the optical axis direction on both sides in the circumferential direction of the rear wall face and face each other in the circumferential direction; and
        a bottom wall face which is extended in the first axis direction on the first direction side of the rear wall face and is contacted with the thrust receiving member from the first direction side; and
        the holding part is opened to the second direction side and to one side in the first axis direction;
    wherein when viewed in the optical axis direction, the pair of the protruded parts is overlapped with the support part;
    wherein the movable body comprises a facing wall part which faces the pair of the protruded parts from the one side in the first axis direction; and
    wherein a separated distance in the first axis direction between the facing wall part and the pair of the protruded parts is narrower than a thickness in the first axis direction of the support part.

2. The optical unit with a shake correction function according to claim 1, wherein
    the movable body comprises a pair of the facing wall parts each of which faces each of the pair of the protruded parts, and
    a space is provided between the pair of the facing wall parts in the circumferential direction.

3. The optical unit with a shake correction function according to claim 2, wherein
    each of the pair of the protruded parts comprises:
        a protruded plate portion which is bent in the first axis direction from an end in the circumferential direction of the plate part; and
        an extended plate portion which is bent to an opposite side to the plate part in the circumferential direction from an end of the protruded plate portion on an opposite side to the plate part, and
    each of the pair of the facing wall parts faces the extended plate portion with the separated distance therebetween.

4. The optical unit with a shake correction function according to claim 2, wherein
    the gimbal frame comprises a gimbal frame extended part which is extended between the pair of the protruded parts in the optical axis direction,
    the gimbal frame extended part comprises the support part at a tip end on the first direction side and a passing part located between the pair of the protruded parts on the second direction side of the support part,
    a width dimension in the circumferential direction of the support part is longer than a width dimension in the circumferential direction of the passing part and is longer than a space between the pair of the protruded parts, and the pair of the facing wall parts faces both end portions in the circumferential direction of the support part.

5. The optical unit with a shake correction function according to claim 4, wherein the gimbal frame extended part is formed in a plate shape, the support part comprises a convex curved face corresponding to the concave curved face on an end face located on an opposite side to the spherical body in the first axis direction, and the convex curved face is located between the pair of the facing wall parts in the circumferential direction.

6. The optical unit with a shake correction function according to claim 4, wherein the thrust receiving member comprises a bent plate part which is bent in the first axis direction from an end on the first direction side of the plate part and is located on the first direction side with respect to the support part, the bent plate part and the support part are overlapped with each other when viewed in the optical axis direction, the bottom wall face is contacted with the bent plate part, and each of the pair of the facing wall parts faces the bent plate part from the one side in the first axis direction.

7. The optical unit with a shake correction function according to claim 1, wherein the movable body comprises one facing wall part which faces both of the pair of the protruded parts.

8. An optical unit with a shake correction function comprising:

a movable body comprising a camera module;

a gimbal mechanism structured to swingably support the movable body around a first axis intersecting an optical axis of the camera module and swingably support the movable body around a second axis intersecting the optical axis and the first axis; and a fixed body which supports the movable body through the gimbal mechanism;

wherein the gimbal mechanism comprises a gimbal frame and a connection mechanism structured to turnably connect the gimbal frame with the fixed body around the second axis;

wherein the connection mechanism comprises:

a gimbal frame receiving member comprising a spherical body and a thrust receiving member made of metal to which the spherical body is fixed; and a support part of the gimbal frame comprising a concave curved face which is contacted with the spherical body;

wherein the fixed body comprises a holding part which holds the gimbal frame receiving member at a position where the second axis passes through a center of the spherical body;

wherein in a case that a direction along the optical axis is referred to as an optical axis direction, one side in the optical axis direction is referred to as a first direction side, an other side in the optical axis direction is referred to as a second direction side, a direction along the second axis is referred to as a second axis direction, and a direction around the optical axis is referred to as a circumferential direction, the thrust receiving member comprises:

a plate part which comprises a spherical body fixing part to which the spherical body is fixed and faces the support part in the second axis direction through the spherical body; and a pair of protruded parts which are protruded to a side where the support part is located from both ends in the circumferential direction on the second direction side with respect to the spherical body fixing part of the plate part, the pair of the protruded parts facing each other in the circumferential direction;

the holding part is formed in a cut-out recessed part comprising:

a rear wall face which is contacted with the plate part from an opposite side to the support part in the second axis direction;

a pair of side wall faces which are extended in the optical axis direction on both sides in the circumferential direction of the rear wall face and face each other in the circumferential direction; and a bottom wall face which is extended in the second axis direction on the first direction side of the rear wall face and is contacted with the thrust receiving member from the first direction side; and the holding part is opened to the second direction side and to one side in the second axis direction;

wherein when viewed in the optical axis direction, the pair of the protruded parts is overlapped with the support part;

wherein the fixed body comprises a facing wall part which faces the pair of the protruded parts from the one side in the second axis direction; and wherein a separated distance in the second axis direction between the facing wall part and the pair of the protruded parts is narrower than a thickness in the second axis direction of the support part.

9. The optical unit with a shake correction function according to claim 8, wherein the fixed body comprises a pair of the facing wall parts each of which faces each of the pair of the protruded parts, and a space is provided between the pair of the facing wall parts in the circumferential direction.

10. The optical unit with a shake correction function according to claim 9, wherein each of the pair of the protruded parts comprises:

a protruded plate portion which is bent in the second axis direction from an end in the circumferential direction of the plate part; and an extended plate portion which is bent to an opposite side to the plate part in the circumferential direction from an end of the protruded plate portion on an opposite side to the plate part, and each of the pair of the facing wall parts faces the extended plate portion with the separated distance therebetween.

11. The optical unit with a shake correction function according to claim 9, wherein the gimbal frame comprises a gimbal frame extended part which is extended between the pair of the protruded parts in the optical axis direction, the gimbal frame extended part comprises the support part at a tip end on the first direction side and a passing part located between the pair of the protruded parts on the second direction side of the support part, a width dimension in the circumferential direction of the support part is longer than a width dimension in the circumferential direction of the passing part and is longer than a space between the pair of the protruded parts, and the pair of the facing wall parts faces both end portions in the circumferential direction of the support part.

12. The optical unit with a shake correction function according to claim 11, wherein the gimbal frame extended part is formed in a plate shape, the support part comprises a convex curved face corresponding to the concave curved face on an end face located on an opposite side to the spherical body in the second axis direction, and the convex curved face is located between the pair of the facing wall parts in the circumferential direction.

13. The optical unit with a shake correction function according to claim 11, wherein the thrust receiving member comprises a bent plate part which is bent in the second axis direction from an end on the first direction side of the plate part and is located on the first direction side with respect to the support part, the bent plate part and the support part are overlapped with each other when viewed in the optical axis direction, the bottom wall face is contacted with the bent plate part, and each of the pair of the facing wall parts faces the bent plate part from the one side in the second axis direction.

14. The optical unit with a shake correction function according to claim 8, wherein the fixed body comprises one facing wall part which faces both of the pair of the protruded parts.

* * * * *